(12) United States Patent
Chen et al.

(10) Patent No.: US 10,505,922 B2
(45) Date of Patent: Dec. 10, 2019

(54) SERVICE IMPLEMENTATION METHOD, PAYMENT METHOD AND APPARATUS

(71) Applicant: Alibaba Group Holding Limited, Grand Cayman (KY)

(72) Inventors: Yuerui Chen, Hangzhou (CN); Yanchun Zhu, Hangzhou (CN); Yang Li, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 273 days.

(21) Appl. No.: 15/018,646

(22) Filed: Feb. 8, 2016

(65) Prior Publication Data

US 2016/0234193 A1 Aug. 11, 2016

(30) Foreign Application Priority Data

Feb. 9, 2015 (CN) .......................... 2015 1 0068086

(51) Int. Cl.
*H04L 29/06* (2006.01)
*G06Q 30/06* (2012.01)
(Continued)

(52) U.S. Cl.
CPC ........... *H04L 63/083* (2013.01); *G06Q 20/10* (2013.01); *G06Q 20/22* (2013.01); *G06Q 20/382* (2013.01);
(Continued)

(58) Field of Classification Search
CPC ....... G06F 21/31; G06F 21/33–21/335; G06Q 20/10; G06Q 20/22;
(Continued)

(56) References Cited

U.S. PATENT DOCUMENTS 5,344,199 A 9/1994 Carstens et al.
6,175,823 B1 1/2001 Van Dusen
(Continued)

FOREIGN PATENT DOCUMENTS

CN 103295132 A 9/2013
CN 103973769 A 8/2014
(Continued)

OTHER PUBLICATIONS

PCT Search Report and Written Opinion dated Apr. 8, 2016 for PCT Application No. PCT/US16/17019, 9 pages.
(Continued)

*Primary Examiner* — Kevin Bechtel
(74) *Attorney, Agent, or Firm* — Lee & Hayes, P.C.

(57) ABSTRACT

A service implementation method, a payment method and an apparatus are disclosed. The service implementation method includes a sending client initiating an interaction request to a server to cause the server to generate an object set and a fetching password associated with the object set, the object set corresponding to a preset object of the sending client; receiving a request response returned by the server, the request response including the fetching password; and displaying the fetching password to a receiving user to enable the receiving user to initiate a fetching request including the fetching password to the server via a receiving client and to obtain the preset object corresponding to the object set. Based on the technical solutions of the present disclosure, service processing may be implemented through a password, thereby facilitating an improvement in the efficiency of service implementation.

16 Claims, 23 Drawing Sheets

(51) Int. Cl.
*G06Q 20/10* (2012.01)
*G06Q 20/22* (2012.01)
*G06Q 20/38* (2012.01)

(52) U.S. Cl.
CPC .............. *G06Q 30/06* (2013.01); *H04L 63/20* (2013.01); *H04L 67/42* (2013.01)

(58) Field of Classification Search
CPC ....... G06Q 20/382–20/38215; G06Q 20/3829; G06Q 30/06; H04L 63/20; H04L 63/0428–63/0492; H04L 63/062–63/064; H04L 63/08; H04L 63/0807; H04L 63/0823; H04L 63/083–63/0846; H04L 67/42; G07F 17/326–17/3297
See application file for complete search history.

(56) References Cited

U.S. PATENT DOCUMENTS

| | | | |
|---|---|---|---|
| 6,370,514 | B1 | 4/2002 | Messner |
| 7,478,143 | B1 | 1/2009 | Friedman et al. |
| 7,805,333 | B2 | 9/2010 | Kepecs |
| 2007/0260522 | A1 | 11/2007 | Bice |
| 2009/0327129 | A1 | 12/2009 | Collas et al. |
| 2010/0280921 | A1* | 11/2010 | Stone ................. G06Q 30/0603 705/27.1 |
| 2011/0069834 | A1* | 3/2011 | Urbanik ................ H04L 9/0618 380/28 |
| 2011/0251962 | A1 | 10/2011 | Hruska |
| 2012/0238351 | A1* | 9/2012 | Pyne ....................... G06Q 30/02 463/25 |
| 2013/0144732 | A1 | 6/2013 | Rothschild |
| 2013/0159190 | A1* | 6/2013 | Paintin .................. G06Q 20/10 705/44 |
| 2013/0275250 | A1 | 10/2013 | Rodell et al. |
| 2014/0128162 | A1* | 5/2014 | Arafat ................... A63F 13/795 463/42 |
| 2014/0129428 | A1* | 5/2014 | Tyler .................. G06Q 20/3226 705/39 |
| 2015/0271162 | A1* | 9/2015 | Dulkin .................... H04L 63/08 726/7 |

FOREIGN PATENT DOCUMENTS

| | | |
|---|---|---|
| CN | 104252613 A | 12/2014 |
| JP | H0965308 | 3/1997 |
| JP | 2006085445 | 3/2006 |
| JP | 2008257721 | 10/2008 |
| JP | 2009031995 | 2/2009 |
| JP | 2013186561 | 9/2013 |
| JP | 2014157430 | 8/2014 |

OTHER PUBLICATIONS

Translation of Chinese Office Action dated Feb. 3, 2019, from corresponding Chinese Patent Application No. 2015100680866, 9 pages.

Translation of Chinese Search Report dated Jan. 28, 2019, from corresponding Chinese Patent Application No. 2015100680866, 1 page.

Office Action issued Apr. 9, 2019 by the Japan Patent Office in corresponding Application No. 2017-539254, a counterpart of U.S. Appl. No. 15/018,646, 14 pages.

English tranlated Second Chinese Office Action dated Sep. 19, 2019 for Chinese Patent Application No. 201510068086.6, a counterpart foreign application of U.S. Appl. No. 15/018,646, 18 pages.

* cited by examiner

SERVICE IMPLEMENTATION METHOD, PAYMENT METHOD AND APPARATUS

CROSS REFERENCE TO RELATED PATENT APPLICATION

This application claims foreign priority to Chinese Patent Application No. 201510068086.6 filed on Feb. 9, 2015, entitled "Service Implementation Method, Payment Method and Apparatus", which is hereby incorporated by reference in its entirety.

TECHNICAL FIELD

The present disclosure relates to the technological field of service implementation, and particularly, to service implementation methods, payment methods and apparatuses.

BACKGROUND

Along with the development of network technologies, a variety of different methods of implementing services have emerged. An interaction of a virtual item in a form of a "red envelope" is used as an example. A user may put an electronic greeting card, a cash gift, etc., into "red envelopes", and designate each object to which the red envelopes are distributed, thereby achieving distribution of the "red envelopes".

However, in a conventional process of service implementation for service objects, a communication between a service initiator and a service receiver is generally performed based on a service address (for example, a URL) or two-dimensional information that includes a service address, thus having a complicated process of service implementation.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In view of the above, the present disclosure provides a service implementation method, a payment method and an apparatus thereof, which can simplify a process of service implementation.

In order to achieve these objectives, the present disclosure provides the following technical solutions.

According to a first aspect of the present disclosure, a service implementation method is provided, which may include a sending client initiating an interaction request to a server to cause the server to generate an object set and a fetching password associated with the object set, the object set corresponding to a preset object of the sending client; receiving a request response returned from the server, the request response including the fetching password; and displaying the fetching password to a receiving user to enable the receiving user to initiate a fetching request including the fetching password to the server via a receiving client, and obtains the preset object corresponding to the object set.

According to a second aspect of the present disclosure, a service implementation method is provided, which may include generating an object set and a fetching password associated with the object set based on an interaction request initiated by a sending client, the object set corresponding to a preset object of the sending client; returning a request response including the fetching password to the sending client to enable the sending client to display the fetching password to a receiving user; and distributing the preset object corresponding to the object set to a receiving client based on a fetching request which includes the fetching password and is initiated by the receiving user via the receiving client.

According to a third aspect of the present disclosure, a payment method is provided, which may include a payer client initiating a payment request to a server to cause the server to create a transaction event and generate a transaction password corresponding to the transaction event, the transaction event corresponding to a transaction amount of a preset value corresponding to the payer client; receiving a request response returned from the server, the request response including the transaction password; and displaying the transaction password to a payee to enable the payee to initiate a payment request including the transaction password to the server via a payee client, and to charge the transaction amount corresponding to the transaction event.

According to a fourth aspect of the present disclosure, a payment method is provided, which may include creating a transaction event and generating a transaction password corresponding to the transaction event according to a payment request initiated by a payer client, the transaction event corresponding to a transaction amount of a preset value corresponding to the payer client; returning a request response including the transaction password to the payer client to enable the payer client to display the transaction password to a payee; and distributing the transaction amount corresponding to the transaction event to the payee client according to a payment request which includes the transaction password and is initiated by the payee through a payee client.

According to a fifth aspect of the present disclosure, a service implementation apparatus is provided, which may include a request initiation unit to allow a sending client to initiate an interaction request to a server to cause the server to generate an object set and a fetching password associated with the object set, the object set corresponding to a preset object of the sending client; a response reception unit to receive a request response returned by the server, the request response including the fetching password; and a password displaying unit to display the fetching password to a receiving user to enable the receiving user to initiate a fetching request including the fetching password to the server through a receiving client, and to obtain the preset object corresponding to the object set.

According to a sixth aspect of the present disclosure, a service implementation apparatus is provided, which include a generation unit to generate an object set and a fetching password associated with the object set according to an interaction request initiated by a sending client, the object set corresponding to a preset object of the sending client; a sending unit to return a request response including the fetching password to the sending client to enable the sending client to display the fetching password to a receiving user; and a distribution unit to distribute the preset object corresponding to the object set to a receiving client according to a fetching request which includes the fetching password and is initiated by the receiving user through the receiving client.

According to a seventh aspect of the present disclosure, a payment apparatus is provided, which may include a request initiation unit to enable a payer client to initiate a payment request to a server to cause the server to create a transaction event and generate a transaction password corresponding to the transaction event, the transaction event corresponding to a transaction amount of a preset value corresponding to the payer client; a response reception unit to receive a request response returned by the server, the request response including the transaction password; and a password displaying unit to display the transaction password to a payee to enable the payee to initiate a payment request including the transaction password to the server through a payee client, and to charge the transaction amount corresponding to the transaction event.

According to an eighth aspect of the present disclosure, a payment apparatus is provided, which may include a request processing unit to create a transaction event and generate a transaction password corresponding to the transaction event according to a payment request initiated by a payer client, the transaction event corresponding to a transaction amount of a preset value corresponding to the payer client; a request responding unit to return a request response including the transaction password to the payer client to enable the payer client to display the transaction password to a payee; and a transaction payment unit to distribute the transaction amount corresponding to the transaction event to the payee client according to a payment request that includes the transaction password and is initiated by the payee through a payee client.

As can be seen from the above technical solutions, the present disclosure receives an interaction request of a sending client, and generates a corresponding object set and a fetching password, so that a receiving user may fetch a preset object in the corresponding object set based on the fetching password only through a receiving client, thus simplifying an interaction process between the sending client and the receiving client, and achieving notification and usage of the fetching password even without the need of direct interaction between the sending client and the receiving client. As such, the procedure of service implementation is simplified, and the efficiency of the service implementation is improved.

DETAILED DESCRIPTION

Figure 1:
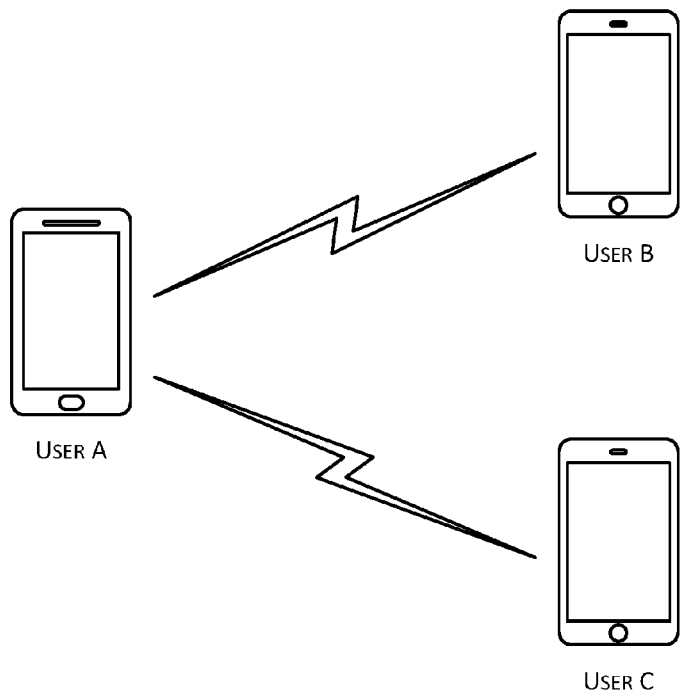
FIG. 1 is a schematic diagram illustrating a scenario of service implementation.

FIG. 1 is a schematic diagram illustrating a scenario 100 in service implementation. The technical solutions of the embodiments of the present disclosure can achieve relevant services between different users, for example, implementing "red envelope" distribution services, payment services, etc. The red envelope distribution service may be referred to as a distribution of a fund or another virtual item of a user to another user in a form of a red envelope. When related services are implemented, existing technologies generally need a service initiator user to know an accurate service receiving user in order to initiate a service. Moreover, a URL address or a two-dimensional code including a URL is generally needed to be generated to notify the service receiving user, having a very complicated implementation process. For example, FIG. 1 shows a scenario 100 which a "red envelope" distribution service is used as an example. If a user A intends to conduct data interaction with a user B, a user C, etc., the user A needs to designate each of the user B, the user C, and the like, as target objects, and the user A will consume a large amount of time resources when the number of users is large. Furthermore, the user B, the user C, etc., need to be associated users of the user A in order for the user A to make designations to the user B, the user C, etc. For example, the user B, the user C, and the like, need to be recorded in the contacts of the user A as "friends", etc., in advance. Moreover, in this process, service receiving users, for example, the user B and the user C, further need to access and complete corresponding services via a service link, for example, a URL or a two-dimensional code, of the services initiated by the user A, thus having a relatively complicated process of service implementation.

Figure 2:
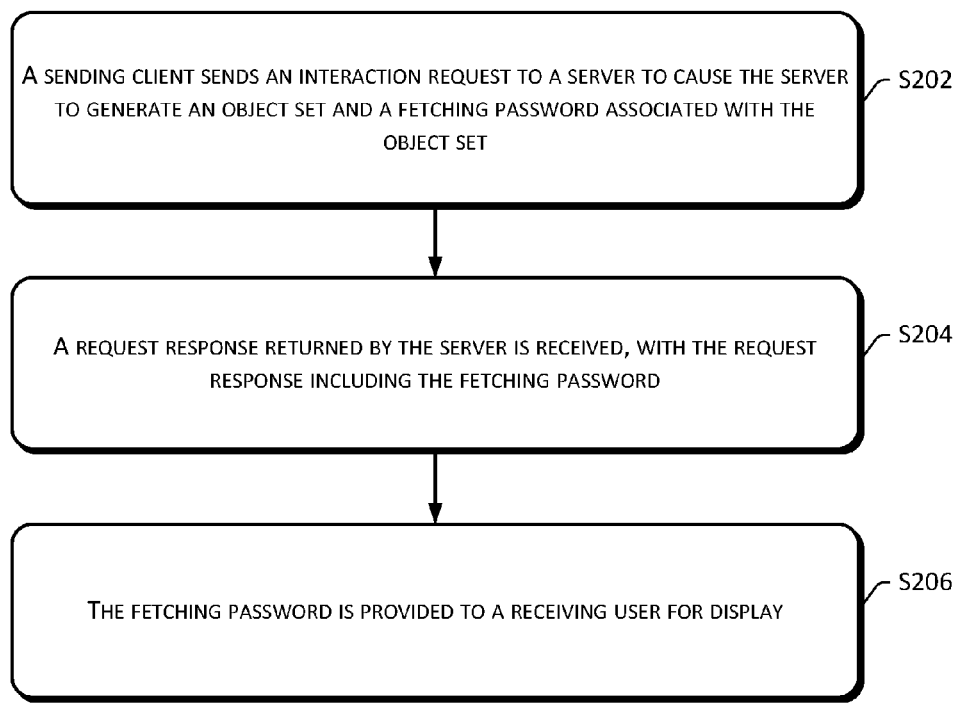
FIG. 2 is a flowchart illustrating a service implementation method based on a terminal side according to an embodiment of the present disclosure.

Accordingly, the present disclosure provides a service implementation method, a payment method and an apparatus, which implement related services, such as a red envelope service, a payment service or other services that can be implemented over a network, in a relatively simple manner. FIG. 2 shows a flowchart of a service implementation method 200 based on a terminal side according to an exemplary embodiment of the present disclosure. As shown in FIG. 2, the method 200 is applied in a terminal corresponding to a sending client, which may include the following method blocks.

At S202, a sending client sends an interaction request to a server to cause the server to generate an object set and a fetching password associated with the object set, with the object set corresponding to a preset object of the sending client.

In implementations, the preset object may include any form of interaction data. As an example, the preset object may be a virtual item, such as a coupon, an electronic greeting card, a cash gift, etc. Correspondingly, the object set may be a set of virtual items. It can be understood that virtual objects correspond to related services for different service implementations. For example, a preset object may be funds in a payment service, and a preset object may be a coupon when a merchant initiates a commercial activity service, etc.

In implementations, based on the interaction request initiated by the sending client, the server may generate one or more object sets, and a respective number of preset objects corresponding to each object set may be one or more. The present disclosure does not have any limitations on the number of object sets or the number of preset objects corresponding to an object set. In implementations, the interaction request may be a request directed to a service to be implemented, for example, the request may be a payment request when a payment service is implemented, or the request may be a red envelope service request when a red envelope service is implemented. In implementations, the request may carry identification information identifying a requested service, and the like. Furthermore, the request may include a user identifier (such as account information of a user) of a service initiator, i.e., a sending user on the sending client. Moreover, the request may also carry information of a corresponding receiving user, and the like. According to different actual application scenarios, the request may include corresponding information to facilitate smooth implementation of an associated service. For example, information of a receiving user may not be included if no restriction is set for the receiving user, etc.

In implementations, the fetching password may be in a form of a character string. The character string may include one or more bits of characters, and each bit of character may be any form of a numeral, a letter, a Chinese character or a symbol, etc. A number of characters and a method of combining the characters that are included in the fetching password may be determined based on requirement(s) or configuration solution(s) in practice.

At S204, a request response returned by the server is received, with the request response including the fetching password.

As an example, the request response may directly include the fetching password, and the sending client may directly obtain a character string, from which the fetching password is constructed, from the request response.

For another example, the request response may include a link that is used to obtain the fetching password, which is equivalent to indirectly including the fetching password in the request response. The sending client may then access the link to obtain the corresponding fetching password and obtain the character string that forms the fetching password.

In another example, a display picture including the fetching password may be generated, and the display picture may be included in the request response.

At S206, the fetching password is provided to a receiving user for display to enable the receiving user to send a fetching request that includes the fetching password to the server via a receiving client, and to obtain the preset object corresponding to the object set.

In implementations, if the sending client is able to directly obtain the fetching password from the request response, or obtain the fetching password by accessing a link in the request response, the sending client may directly display the fetching password to the receiving user. Alternatively, the sending client may generate a display picture including the fetching password, and provide the display picture to the receiving user for presentation. Additionally or alternatively, in implementations, the request response may directly include a display picture, and the sending client may directly use the display picture.

When the fetching password or the display picture is displayed, the fetching password or the display picture may be sent to the receiving client of the receiving user, or may be shared to a social networking platform that can be viewed by the receiving user, or may be directly dictated to the receiving user, or the like.

Apparently, if the request response includes an access link associated with the fetching password, the sending client may also directly provide the link to the receiving user for display. A display approach is the same as that for the fetching password or the display picture, and thus is not repeatedly described herein.

In implementations, a "sending client" refers to an application to which a registration account of a sending user logs in. The application may be located in any terminal device. Similarly, a "receiving client" refers to an application to which a registration account of a receiving user logs in, and the application may also be located in any terminal device.

Figure 3:
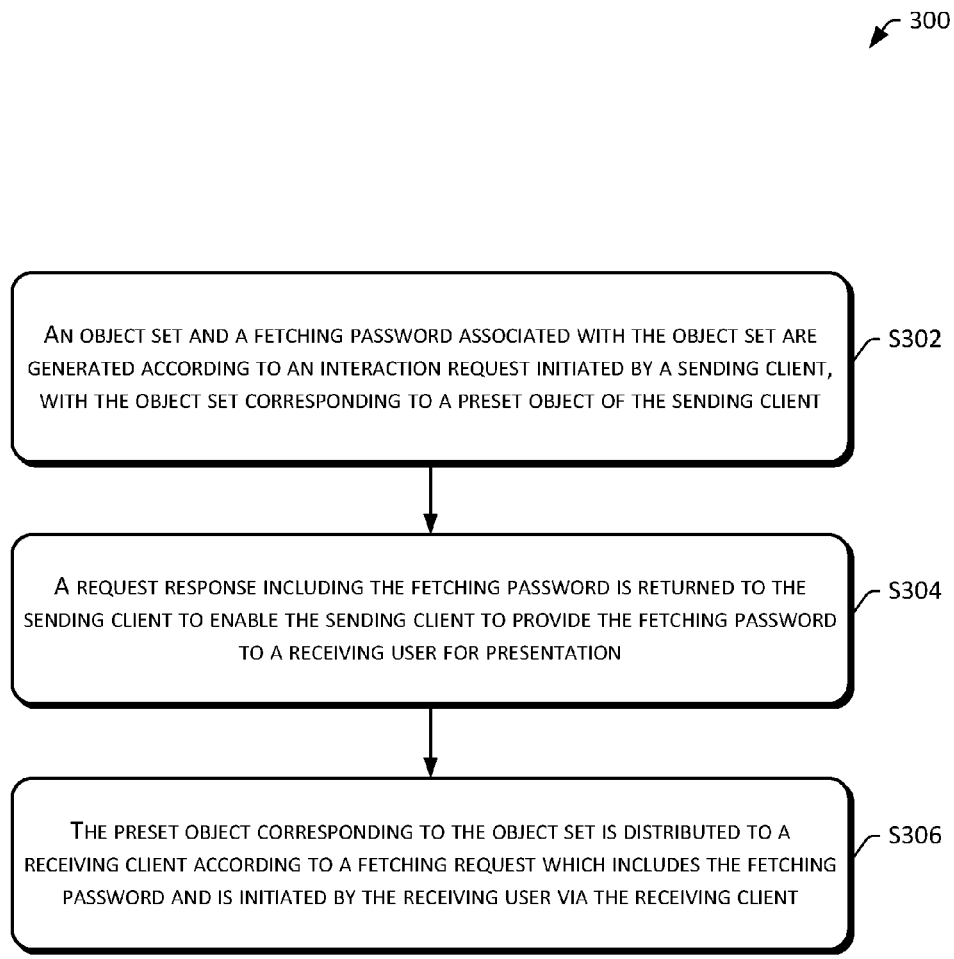
FIG. 3 is a flowchart illustrating a service implementation method based on a server side according to an embodiment of the present disclosure.

Corresponding to the embodiment of FIG. 2, FIG. 3 shows a flowchart of a service implementation method 300 based on a server side according to an exemplary embodiment of the present disclosure. As shown in FIG. 3, the method 300 is applied to a server, and may include the following method blocks.

At S302, an object set and a fetching password associated with the object set are generated according to an interaction request initiated by a sending client, with the object set corresponding to a preset object of the sending client.

In implementations, as an example of "generating an object set", the server may create an object set, and add a preset object of the sending client into the object set. Correspondingly, when the server distributes the preset object corresponding to the object set to a receiving client, the server may distribute the preset object in the object set to the receiving client in practice.

In implementations, as another example of "generating an object set", the server may create object set, and associate the object set with a preset object of the sending client. Correspondingly, when the server distributes the preset object corresponding to the object set to a receiving client, the server may actually obtain the preset object associated with the object set of the sending client, and distribute the preset object to the receiving client.

The preset object in the sending client may refer to a preset object corresponding to a user of the sending client, and the preset object may be a resource, such as funds, stored in the server or other devices.

At S304, a request response including the fetching password is returned to the sending client to enable the sending client to provide the fetching password to a receiving user for presentation.

At S306, the preset object corresponding to the object set is distributed to a receiving client according to a fetching request which includes the fetching password and is initiated by the receiving user via the receiving client.

In implementations, the server may determine an object distribution proportion, and calculate to obtain an actual distribution quantity according to a number of preset objects and the object distribution proportion. The server may then distribute preset objects corresponding to the actual distribution quantity to the receiving client. In implementations, the "object distribution proportion" may be any pre-defined proportion such as 100%. Alternatively, the "object distribution proportion" may be a random proportion that is generated in real time, e.g., any value in 0-100%.

In implementations, the receiving user may further guess and input the number of preset objects in the object set. Accordingly, the server may obtain the number inputted by the user from the fetching request. When the number inputted by the user is equal to the number of preset objects, the server distributes the preset objects to the receiving client. Apparently, a manner of distribution in this case is the same as that described above, i.e., the preset objects are distributed according to an object distribution proportion that is defined in advance or generated in real time.

As can be seen from the foregoing implementations, the disclosed method receives an interaction request of a sending client, and generates a corresponding object set and a fetching password to enable a receiving user to fetch a preset object from a corresponding object set via a receiving client based on the fetching password only, thus simplifying an interaction process between the sending client and the receiving client, and achieving notification and usage of the fetching password even without the need of a direct interaction between the sending client and the receiving client. As such, a process of service implementation is simplified, and the efficiency of the service implementation is improved.

Figure 4:
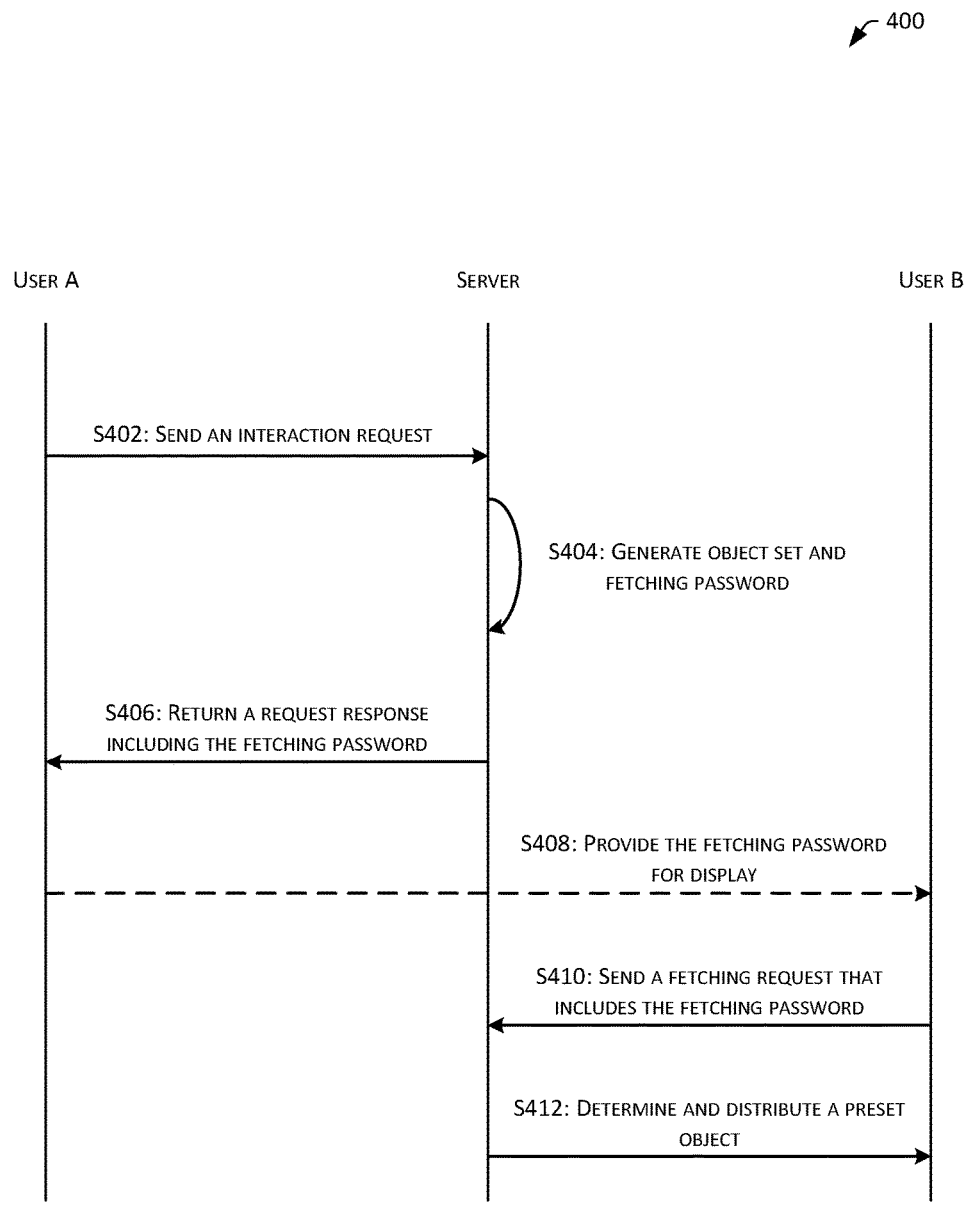
FIG. 4 is a flowchart illustrating a service implementation method according to an embodiment of the present disclosure.

As a process of interaction among a sending client, a receiving client and a server is involved, the process of interaction among these three parties is described in detail hereinafter using an interaction process between a user A and a user B as an example with the conjunction of FIG. 4. FIG. 4 shows a flowchart of a service implementation method 400 according to an exemplary embodiment of the present disclosure. As shown in FIG. 4, the method 400 may include the following method blocks.

At S402, the user A, who acts as a sending user, initiates and sends an interaction request to a server through a sending client.

In implementations, a "red envelope" distribution service is used as an example for illustration. Apparently, one skilled in the art should understand that a technical solution of the present disclosure for service implementation is apparently applicable to service implementation scenarios in other data interaction processes, which are not limited in the present disclosure.

Figure 5:
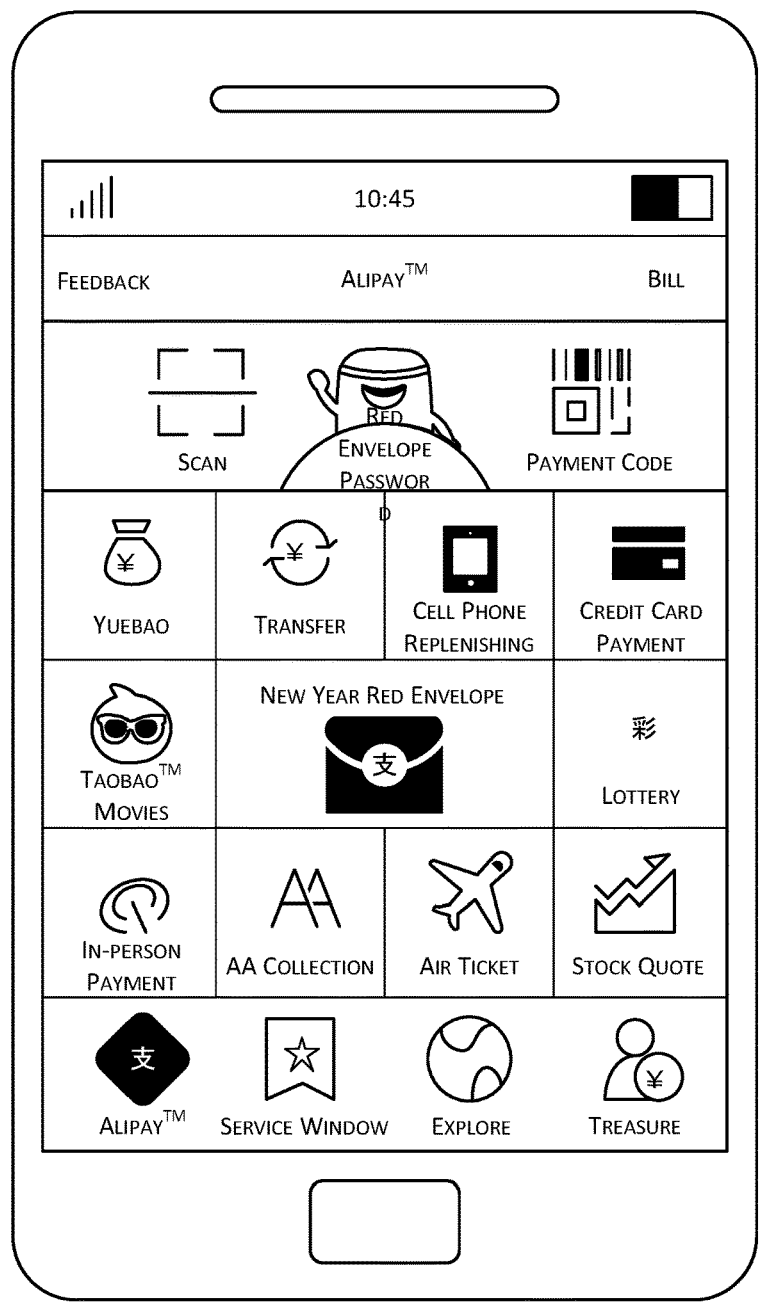
FIGS. 5 and 6 are schematic diagrams illustrating a terminal interface according to an embodiment of the present disclosure.
Figure 6:
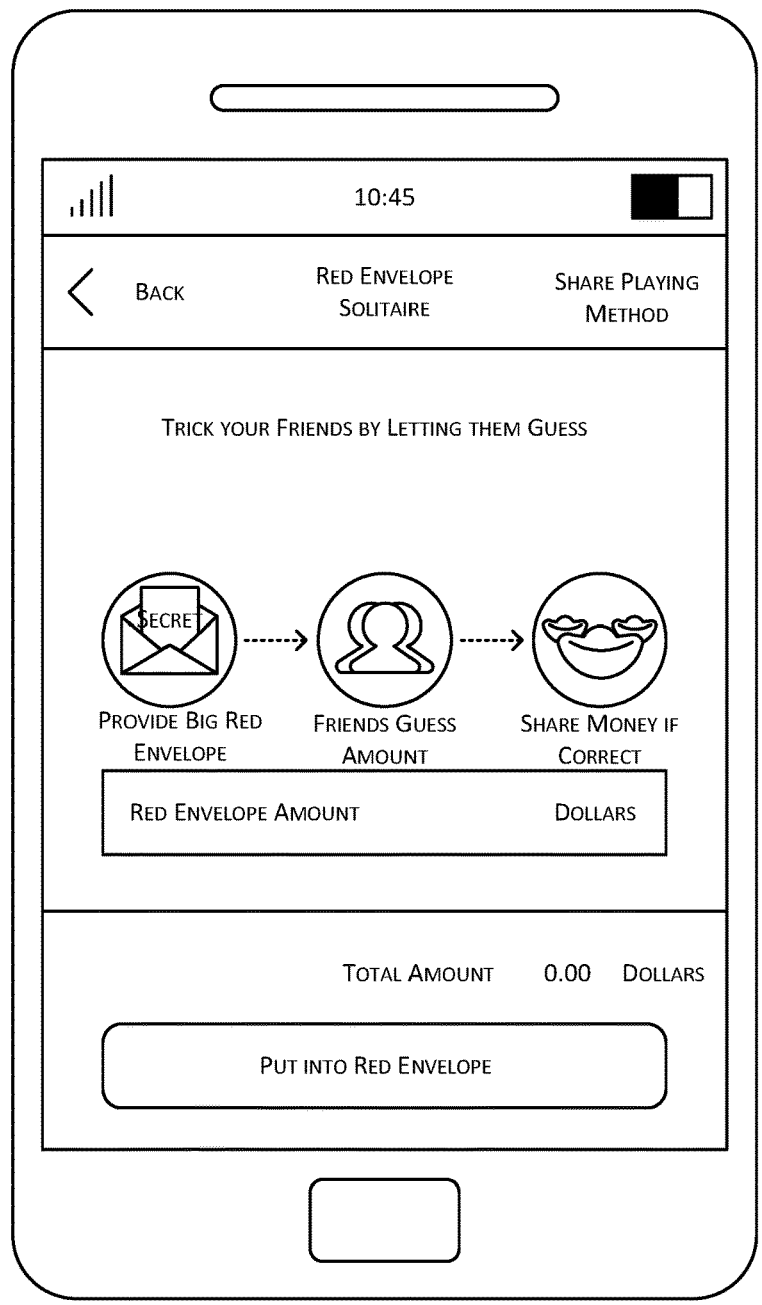

An "Alipay™" application for implementing a red envelope distribution by the user A is used as an example. The user A may enter a red envelope generation interface by triggering a "New Year Red Envelope" text or a corresponding "Red Envelope" pattern in an "Alipay™" application interface 500 as shown in FIG. 5. For example, FIG. 6 shows one form of a red envelope generation interface 600, i.e., "Red Envelope Solitaire". After the user inputs an "Amount for Red Envelope" and clicks "Put into Red Envelope", a generation of a "Red Envelope Solitaire" is completed. Furthermore, the "Alipay™" application may initiate a corresponding interaction request to the server based on information such as a login account of the user A, an input for "Amount for Red Envelope", and a red envelope type of "Red Envelope Solitaire", etc.

At S404, the server generates an object set and a fetching password associated with the object set according to the interaction request initiated by the user A.

In implementations, in an application scenario of "red envelope" distribution, the object set may include a virtual account that is generated by the server and correspond to the "Red Envelope". The virtual account may correspond to funds in an account a of the user A, and an amount of the funds is the "Amount for Red Envelope" that is inputted by the user.

In implementations, the fetching password may have a certain life cycle, for example, five minutes. After the life cycle expires, the server may delete an association relationship between the fetching password and the object set, and recycle the fetching password. In implementations, the server may store recycled fetching passwords in a recycling database, and may directly select and use a fetching password from the recycling database next time when an interaction request is received, thereby skipping a process of generating the fetching password.

Figure 7:
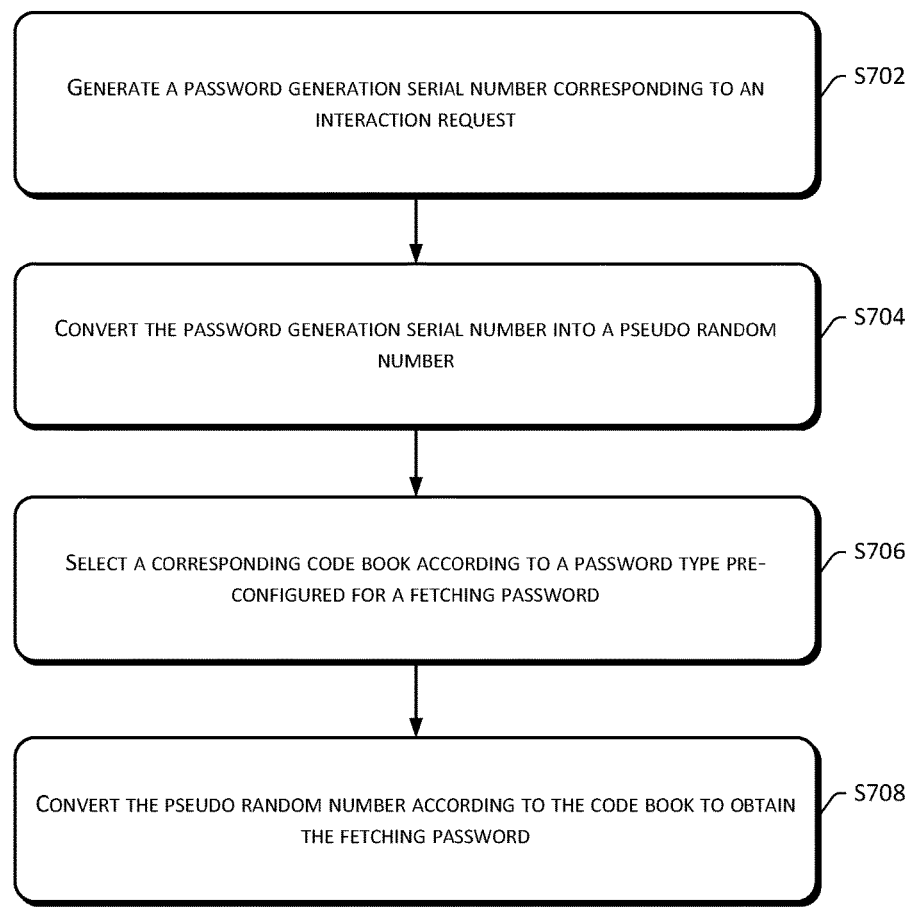
FIG. 7 is a flowchart of generating a password according to an embodiment of the present disclosure.

In implementations, FIG. 7 shows a flowchart of generating a password according to an exemplary embodiment of the present disclosure. As shown in FIG. 7, a process 700 thereof may include:

S702 generates a password generation serial number corresponding to the interaction request.

In implementations, the password generation serial number may be ID information (i.e., identity information) that is distributed when a fetching password is generated for each interaction request. For example, an incremental ID may be generated to serve as a password generation serial number by using an incremental sequence.

S704 converts the password generation serial number into a pseudo random number.

In implementations, converting the password generation serial number into the pseudo random number facilitates an improvement in randomness of the correspondingly generated fetching password, thus avoiding a detection of rule(s) of generating the fetching password, and ensuring the high security of the fetching password.

It should be noted that processing function(s) used for generating a pseudo random number in existing technologies may be applied in the technical solutions of the present disclosure to convert a password generation serial number into a pseudo random number, which is not limited in the present disclosure. For example, a processing function may increase any incremental ID by 100. For an example of incremental ID=1, a corresponding pseudo random number 101 may be obtained.

S706 selects a corresponding code book according to a password type pre-configured for the fetching password.

In implementations, a password type may include information such as a number of characters and a combination method for the characters. The fetching password may be a form of a character string, and the number of characters is a number of characters from which the character string is constructed. For example, a number of characters of "0000" is 4, and a number of characters of "adf94d" is 6. The character combination method is a respective type of each bit of character of the character string, such as "all characters are numerals" and "the last character is a numeral and other characters are letters", etc. Each character may be of any type such as a numeral, a letter, a Chinese character, or a special symbol, which is not limited in the present disclosure.

In implementations, each code book may include a mapping relationship between corresponding plaintext characters in the pseudo random number and corresponding ciphertext characters in the character combination method. For example, when the pseudo random number is 101 with the character combination method as "the last character is a numeral and other characters are letters", the pseudo random number 101 corresponds to at least two code books. A first code book includes a mapping relationship of "numeral (plaintext)→numeral (ciphertext)", and a second code book includes a mapping relationship of "numeral (plaintext)→letter (ciphertext)".

S708 converts the pseudo random number according to the code book to obtain the fetching password.

In implementations, if a ciphertext corresponding to a plaintext "1" in the first code book is "8", and a ciphertext corresponding to a plaintext "0" in the second code book is "z", a fetching password corresponding to the pseudo random number 101 is 8z8.

S406 returns a request response including the fetching password from the server to the user A.

In implementations, the fetching password may be a character string. The character string may include one or more bits of characters, and each bit of character may be any form of a numeral, a letter, a Chinese character or a symbol, etc. The server may then directly include the character string of the fetching password in the request response, and send the request response to the user A. Alternatively, the server may generate a display picture that includes the fetching password, and send the display picture to the user A.

When a display picture is generated, the server may generate the display picture statically based on a pre-defined fixed template. Alternatively, multiple templates may be pre-defined, and the server may generate a template ID corresponding to the current fetching password, and obtain a picture attribute template corresponding to the template ID to dynamically generate a display picture according to the picture attribute template. In implementations, the picture attribute template may include any combination of a plurality of different attributes such as a background picture, a background color, a text color, a text size and a style type, etc., to ensure a diversity of styles of display pictures and to prevent corresponding rules from being detected easily.

Apparently, when the sending client of the user A receives the fetching password returned by the server, a display picture may also be generated locally. A method of such generation is similar to that in the server (a picture attribute template that is needed may be downloaded from the server, if not exists locally), and is not redundantly described herein.

At S408, the user A provides the fetching password for display to the user B who acts as a receiving user for presentation.

Figure 8:
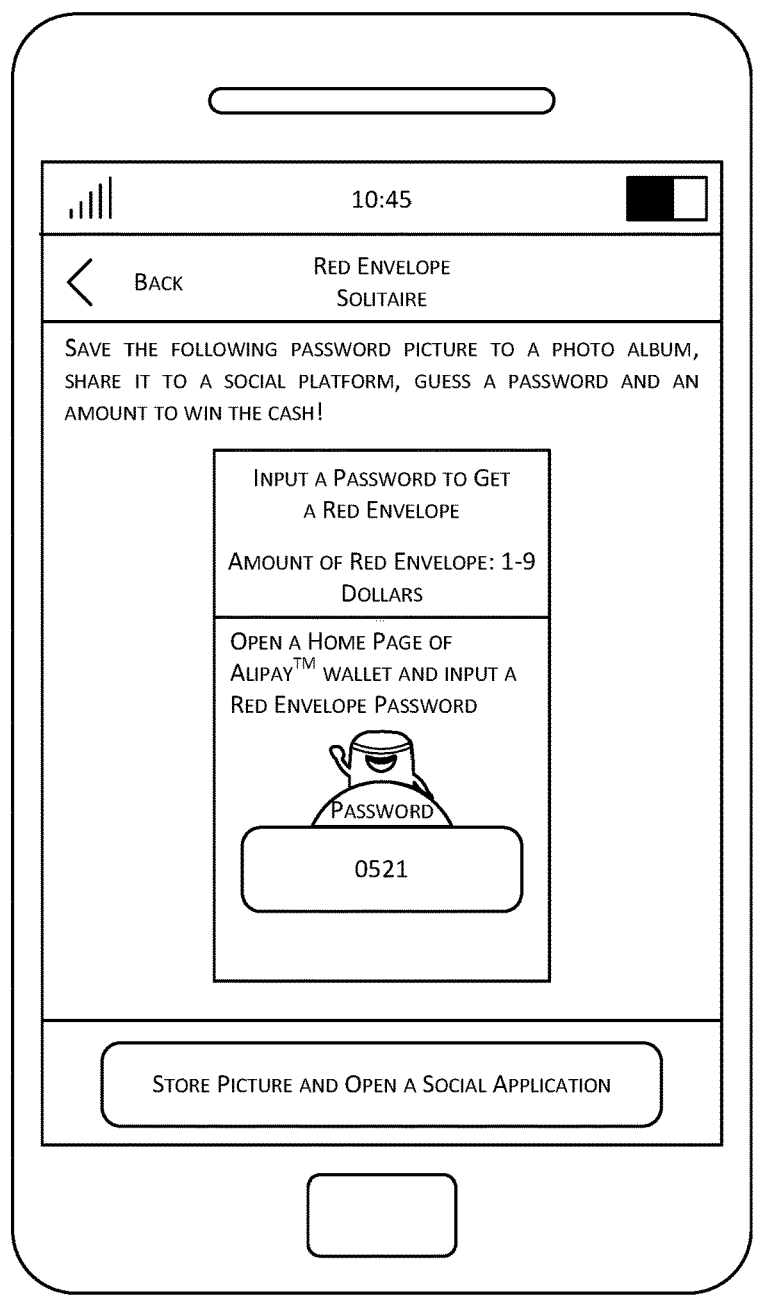
FIGS. 8-10 are schematic diagrams illustrating a terminal interface according to exemplary embodiments of the present disclosure.

In implementations, a "display picture" is used as an example. The sending client may display the display picture to the user A via an interface 800 as shown in FIG. 8, and the user A displays the display picture to the user B. For example, using the interface as shown in FIG. 8, the user A may store the display picture locally, and share the display picture to a social networking platform via a social application, so that the user B can view the fetching password in the display picture that is shared by the user A in the social networking platform.

Apparently, the user A may further achieve a display of the fetching password in other manners. For example, the user A may directly send the display picture to the user B, for example, using instant messaging. Alternatively, the user A may further notify the user B of the fetching password in any manner such as verbal communication and broadcasting.

At S410, the user B initiates and sends a fetching request to the server through the receiving client, with the fetching request including the fetching password that the user A has provided for presentation.

Figure 9:
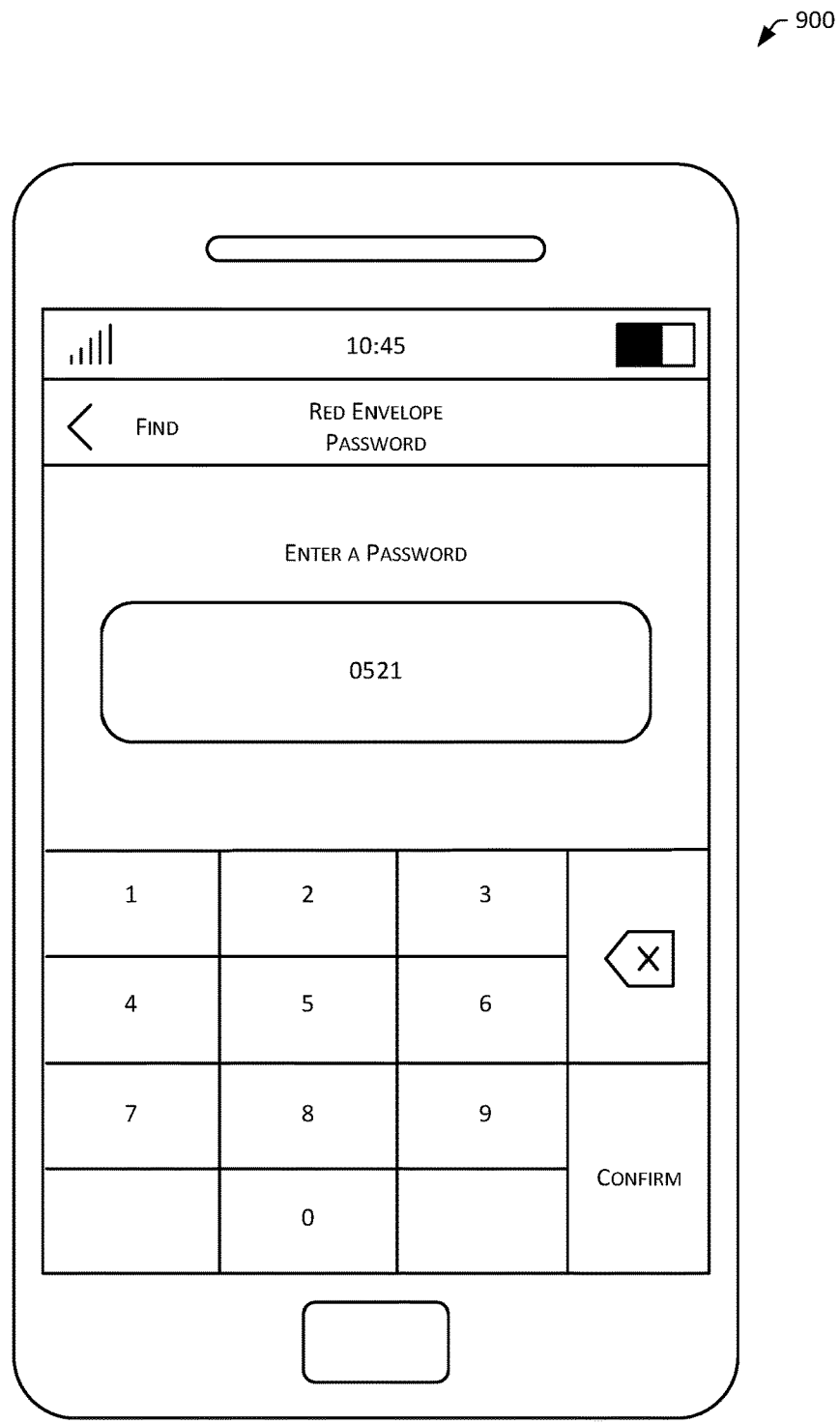

In implementations, the receiving client of the user B may be an "Alipay™" application that has completed an account login. The user may enter into a password input interface 900 as shown in FIG. 9 by clicking a "Red Envelope Password" in the application interface as shown in FIG. 5, and input the fetching password as the user A has provided for presentation. For example, the password is "0521".

At S412, the server determines an object set corresponding to the fetching password, and distributes a preset object in the object set to the user B.

In implementations, a plurality of different ways may exist for rule(s) of distributing the preset object. As an exemplary embodiment, after the user B inputs a correct fetching password, the server may distribute a preset object corresponding to a corresponding object set to the user B according to a preset proportion. The preset proportion may be a distribution proportion that is defined in advance, e.g., 100%. Alternatively, the preset proportion may be a random proportion that is generated in real time, and the random proportion may be any value between 0% and 100%.

Figure 10:
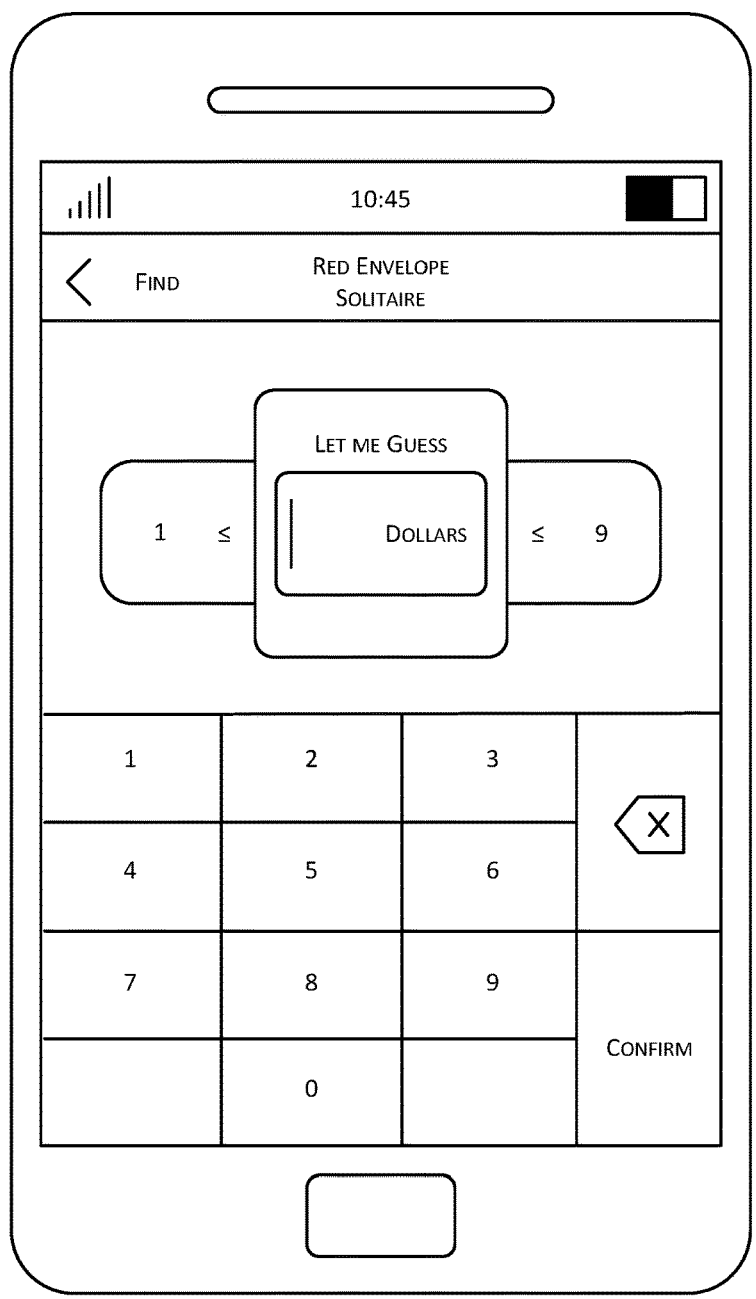

In an example embodiment corresponding to the "Red Envelope Solitaire" as shown in FIG. 6 and based on the password input interface as shown in FIG. 9, after the user B inputs the correct fetching password, the server may return a response message to the receiving client corresponding to the user B. The receiving client may further presents an amount input interface 1000 as shown in FIG. 10. The user B may guess a cash gift amount (i.e., a number of preset objects corresponding to an object set) corresponding to a red envelope and input a guessed numeral. The guessed numeral may then be sent to the server, which determines whether this numeral is the same as a number of preset objects corresponding to an object set that corresponds to the fetching password. If being the same, a distribution is performed according to a preset proportion (i.e., a distribution proportion that is defined in advance or a random proportion that is generated in real time). Otherwise, no distribution is performed or a distribution proportion is reduced (e.g., lower than a preset proportion in an event that they are the same).

In implementations, after the user B inputs the correct fetching password, the server may add a numeral range, to which the cash gift amount (i.e., the number of preset objects) belongs, into the response message returned to the receiving client corresponding to the user B based on the cash gift amount (i.e., the number of preset objects corresponding to the corresponding object set) corresponding to the red envelope. For example, a message that the cash gift amount is 1-9 yuan is provided in the amount input interface as shown in FIG. 10.

It should be noted that a plurality of different ways of transferring funds (or other forms of preset objects corresponding to object sets) corresponding to a red envelope may exist in a process of data interaction. Two possible forms thereof are described using examples hereinafter.

1. Advance Payment

Figure 11:
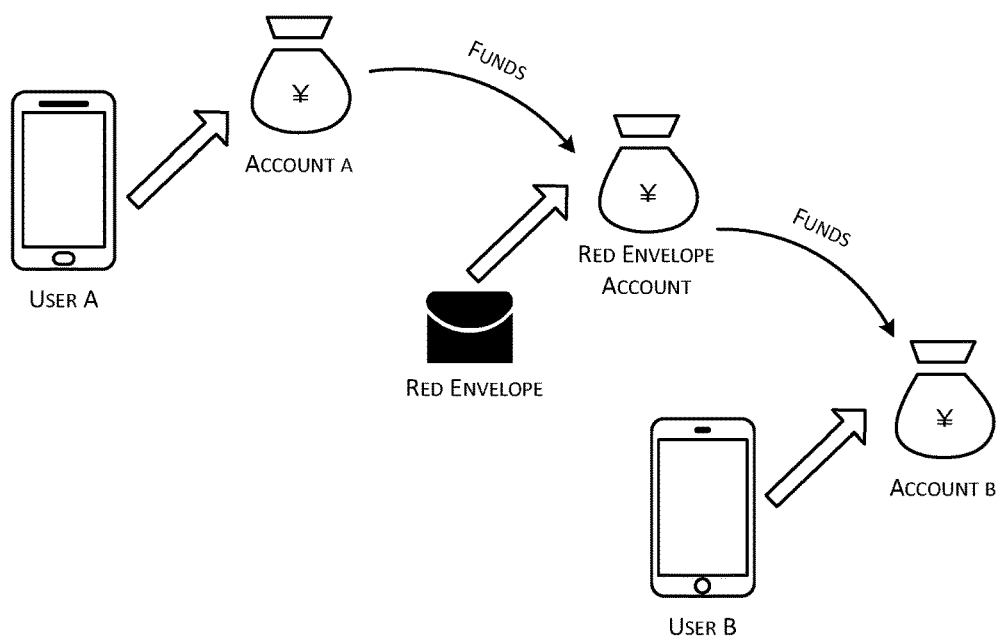
FIG. 11 is a schematic diagram illustrating a funds transfer according to an embodiment of the present disclosure.

FIG. 11 shows a schematic diagram of a funds transfer 1100 according to an exemplary embodiment of the present disclosure. As shown in FIG. 11, after the user A initiates an interaction request to the server through the sending client, the server may directly extract a corresponding amount of funds from the account a corresponding to the user A based on an amount of a red envelope inputted by the user A, and transfer the extracted fund to a red envelope account corresponding to the red envelope. The user B may then provide a correct fetching password to the server. In response to determining that a certain amount of funds is needed to be distributed to the user B, such amount of funds may be extracted from the red envelope account and transferred to the account b corresponding to the user B.

2. Real-Time Payment

Figure 12:
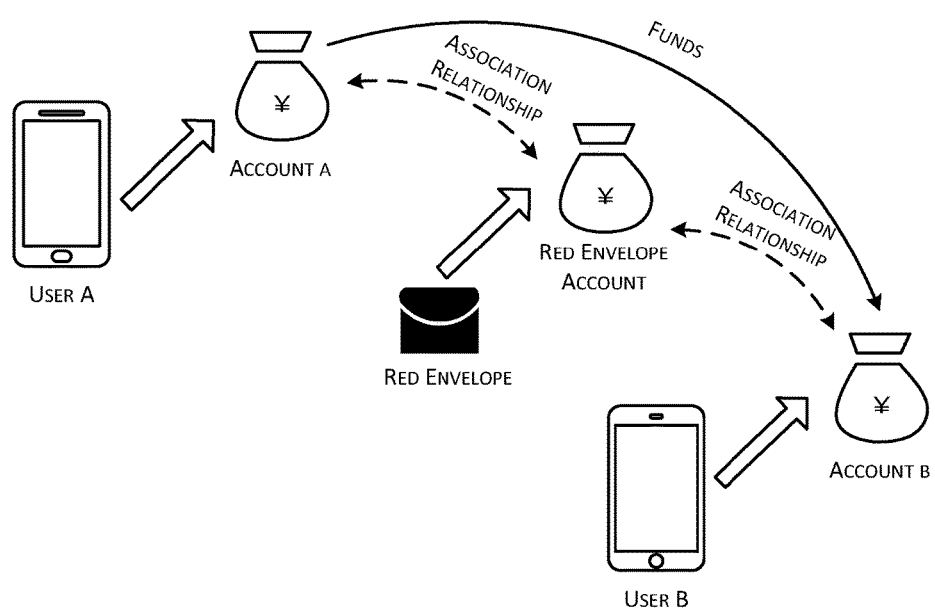
FIG. 12 is a schematic diagram illustrating another funds transfer according to an exemplary embodiment of the present disclosure.

FIG. 12 shows a schematic diagram of another funds transfer 1200 according to an exemplary embodiment of the present disclosure. As shown in FIG. 12, after the user A initiates an interaction request to the server through the sending client, based on the red envelope amount input by the user A, the server may establish an association between a corresponding amount of funds in the account a corresponding to the user A and a red envelope account corresponding to a red envelope, without transferring the funds to the red envelope account (optionally, this portion of funds in the account a may be frozen). Alternatively, the red envelope account may be considered as the account a, and may be identified using a red envelope identification. After the user B provides a correct fetching password to the server and confirms that a certain amount of funds is needed to be distributed to the user B, a determination is made that the funds that is needed by the account b is to be obtained from the account a based on an association relationship between the fetching password and the red envelope and the association relationship between the red envelope account and the account a. The needed amount of funds is then transferred directly from the account a to the account b.

It is noted that an interaction request initiated by an initiating client may include user information of a service receiver in the embodiment of the present disclosure. For example, if a user A initiates a red envelope service, buddies such as a user B, a user C and a user D may be designated to extract a red envelope according to a password in an interaction request, and only a fetching password inputted by the user(s) designated in the interaction request is valid. Alternatively, the interaction request may also designate a type of users (for example, users having a friend relationship with the user A) is able to complete a corresponding service according to a fetching password, etc.

In the embodiments of the present disclosure, a password may be used as an interface for implementing a service. Compared with the existing technologies that implement a service interface via a link address or a two-dimensional code, the present disclosure is simple and fast, and has a higher efficiency of service implementation.

Figure 13:
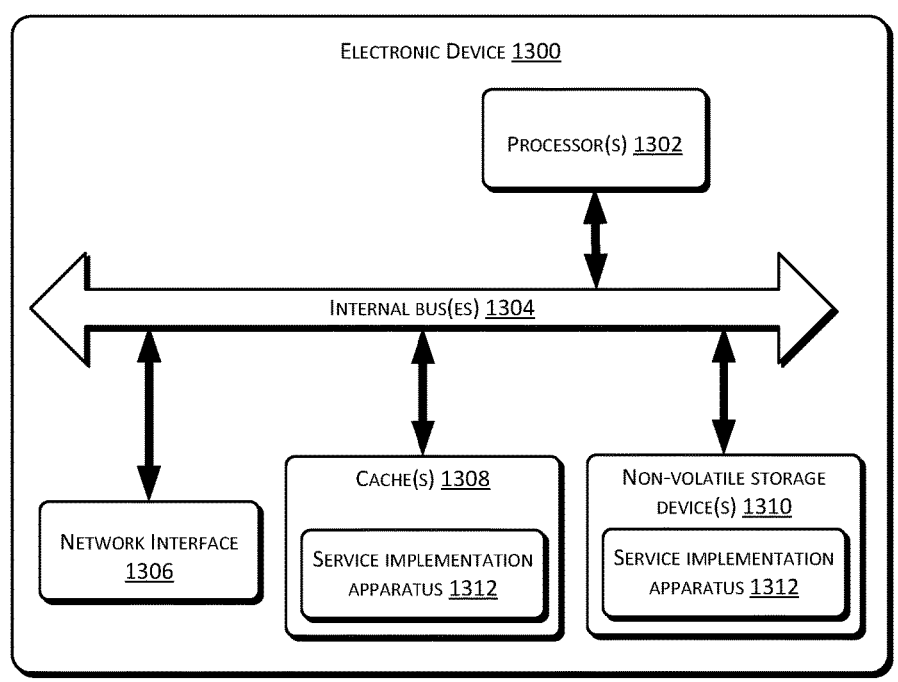
FIG. 13 is a structural diagram illustrating an electronic device based on a terminal side according to an exemplary embodiment of the present disclosure.

FIG. 13 is a schematic structural diagram of an electronic device 1300 based on a terminal side according to an exemplary embodiment of the present disclosure. As shown in FIG. 13, the electronic device 1300 may include processor(s) 1302, internal bus(es) 1304, network interface(s) 1306, cache(s) 1308, and non-volatile storage device(s) 1310 on a hardware level. Apparently, the electronic device 1300 may further include hardware needed by other services. The processor(s) 1302 may read a corresponding computer program from the non-volatile storage device(s) 1310 into the cache(s) 1308, and run the computer program, thereby forming a service implementation apparatus 1312 on a logic level. Apparently, other than software implementation, the present disclosure may include other ways of implementation, such as logic devices or a combination of software and hardware, etc. In other words, entities that perform processing procedure(s) as follows are not limited to various logic units, and may also include hardware or logic devices.

Figure 14:
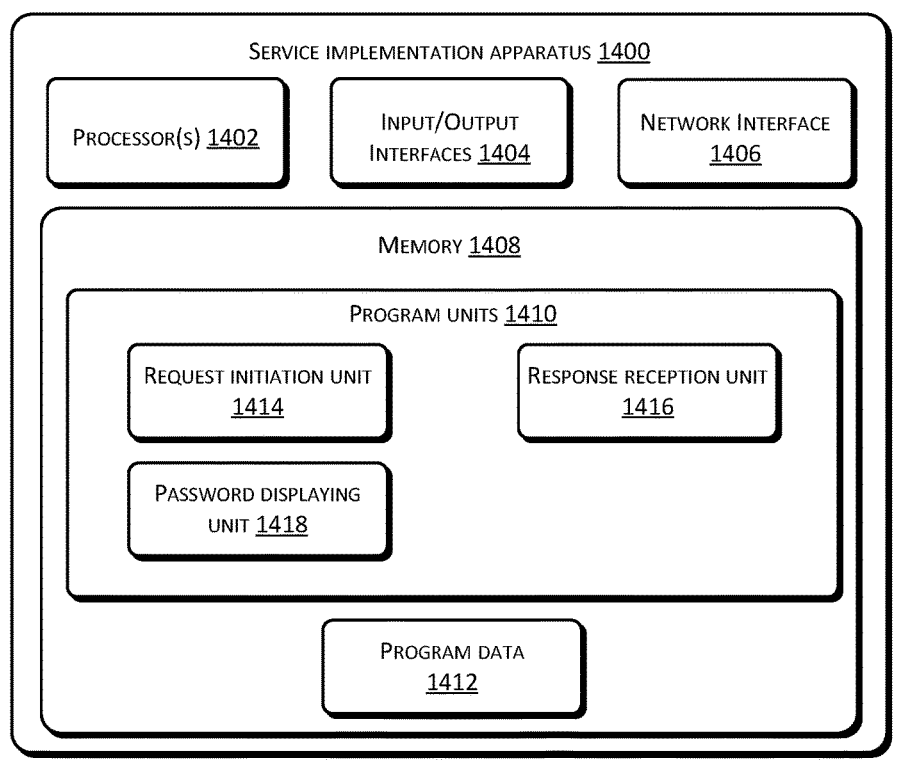
FIG. 14 is a schematic diagram illustrating a service implementation apparatus based on a terminal side according to an exemplary embodiment of the present disclosure.

Referring to FIG. 14, in implementations, a service implementation apparatus 1400 may be applied in a terminal of a sending client, and may include one or more processors 1402, an input/output (I/O) interface 1404, a network interface 1406 and memory 1408.

The memory 1408 may include a form of computer-readable media, e.g., a non-permanent storage device, random-access memory (RAM) and/or a nonvolatile internal storage, such as read-only memory (ROM) or flash RAM. The memory 1408 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 1408 may include program units 1410 and program data 1412. In implementations, the program units 1410 may include a request initiation unit 1414, a response reception unit 1416 and a password displaying unit 1418.

The request initiation unit 1414 may allow a sending client to initiate an interaction request to a server to cause the server to generate an object set and a fetching password associated with the object set, with the object set corresponding to a preset object of the sending client. The response reception unit 1416 may receive a request response returned from the server, with the request response including the fetching password. The password displaying unit 1418 may provide the fetching password to a receiving user for display to enable the receiving user to initiate a fetching request that includes the fetching password to the server through a receiving client, and to obtain the preset object corresponding to the object set.

In implementations, the password displaying unit 1418 may further generate a display picture including the fetching password or obtain the display picture that is included in the request response, and provide the display picture to the receiving user for display.

In implementations, the password displaying unit 1418 may provide the display picture to the receiving user for display by sending the display picture to the receiving client or sharing the display picture in a social networking platform.

In implementations, the password displaying unit 1418 may generate the display picture including the fetching password using an approach as follows:

generating a template ID corresponding to the fetching password or obtaining the template ID included in the request response;

obtaining a picture attribute template corresponding to the template ID from local data or the server; and dynamically generating the display picture according to the picture attribute template.

Figure 15:
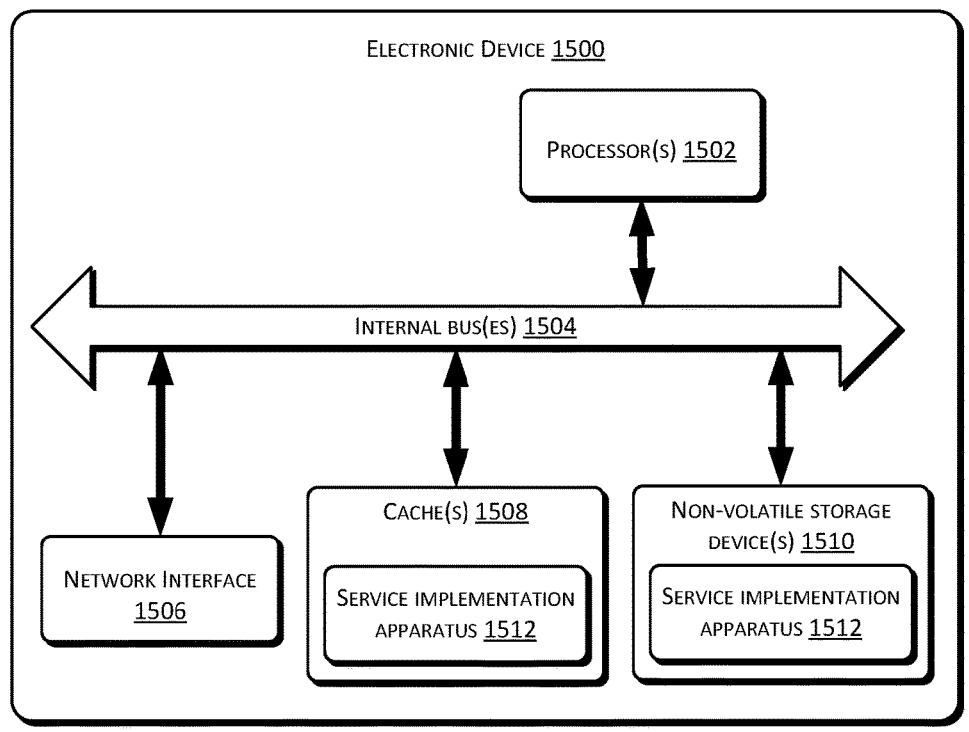
FIG. 15 is a structural diagram illustrating an electronic device based on a server side according to an exemplary embodiment of the present disclosure.

FIG. 15 is a structural diagram of an electronic device 1500 based on a server according to an exemplary embodiment of the present disclosure. Referring to FIG. 15, on hardware level, the electronic device 1500 may include processor(s) 1502, internal bus(es) 1504, network interface(s) 1506, cache(s) 1508, and non-volatile storage device(s) 1510 on a hardware level. Apparently, the electronic device 1500 may further include hardware needed by other services. The processor(s) 1502 may read a corresponding computer program from the non-volatile storage device(s) 1510 into the cache(s) 1508, and run the computer program, thereby forming a service implementation apparatus 1512 on a logic level. Apparently, other than software implementation, the present disclosure may include other ways of implementation, such as logic devices or a combination of software and hardware, etc. In other words, entities that perform processing procedure(s) as follows are not limited to various logic units, and may also include hardware or logic devices.

Figure 16:
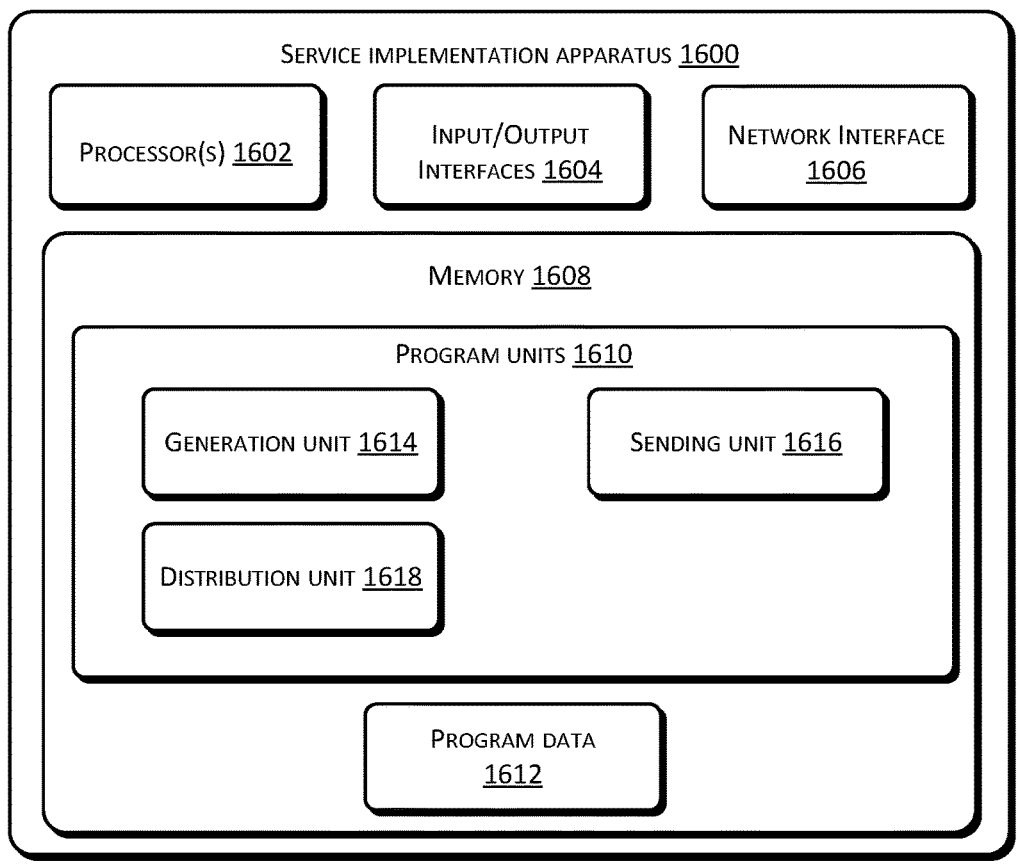
FIG. 16 is a schematic diagram illustrating a service implementation apparatus based on a server side according to an exemplary embodiment of the present disclosure.

Referring to FIG. 16, in implementations, a service implementation apparatus 1600 may be applied to a server, and may include one or more processors 1602, an input/output (I/O) interface 1604, a network interface 1606 and memory 1608.

The memory 1608 may include a form of computer-readable media, e.g., a non-permanent storage device, random-access memory (RAM) and/or a nonvolatile internal storage, such as read-only memory (ROM) or flash RAM. The memory 1608 is an example of computer-readable media as illustrated in the foregoing description.

In implementations, the memory 1608 may include program units 1610 and program data 1612. In implementations, the program units 1610 may include a generation unit 1614, a sending unit 1616 and a distribution unit 1618.

The generation unit 1614 may generate an object set and a fetching password associated with the object set according to an interaction request that is initiated by a sending client, where the object set corresponds to a preset object of the sending client. The sending unit 1616 may return a request response including the fetching password to the sending client to enable the sending client to provide the fetching password to a receiving user for display. The distribution unit 1618 may distribute the preset object corresponding to the object set to a receiving client according to a fetching request that includes the fetching password and is initiated by the receiving user through the receiving client.

In implementations, the generation unit 1614 may generate the fetching password using an approach that includes:

generating a password generation serial number corresponding to the interaction request using an incremental sequence;

determining a distributed node device configured to process the password generation serial number, and obtaining an ascending value pre-configured for the distributed node device;

increasing the password generation serial number according to the ascending value to obtain a pseudo random number; and selecting a corresponding code book according to a password type pre-configured for the fetching password and converting the pseudo random number according to the code book to obtain the fetching password.

In implementations, the password type may include a number of bits and a character type of each bit.

In implementations, the sending unit 1616 may further generate a display picture that includes the fetching password, add the display picture into the request response, which is sent to the sending client.

In implementations, the sending unit 1616 may generate the display picture that includes the fetching password using an approach that includes:

generating a template ID corresponding to the fetching password or obtaining the template ID included in the request response;

obtaining a picture attribute template corresponding to the template ID from local data or the server; and dynamically generating the display picture according to the picture attribute template.

In implementations, the generation unit 1614 may generate the object set by creating the object set and adding the preset object of the sending client into the object set. The distribution unit 1618 may distribute the preset object corresponding to the object set to the receiving client by distributing the preset object in the object set to the receiving client.

In implementations, the generation unit 1614 may generate the object set by creating the object set and associating the object set with the preset object of the sending client. The distribution unit 1618 may distribute the preset object corresponding to the object set to the receiving client by obtaining the preset object associated with the object set of the sending client and distributing the preset object to the receiving client.

In implementations, the distribution unit 1618 may further determine an object distribution proportion, calculate to obtain an actual distribution quantity according to a number of preset objects and the object distribution proportion, and distribute preset object(s) corresponding to the actual distribution quantity to the receiving client.

In implementations, the distribution unit 1618 may further obtain a number inputted by the user from the fetching request, and distribute preset object(s) to the receiving client when the number inputted by the user is equal to the number of the preset objects.

More specifically, the technical solutions of the present disclosure are applicable to a "payment" scenario. For example, the "red envelope" distribution involved in the embodiment shown in FIG. 4 actually belongs to a process that the user A makes a "payment" to the user B. Therefore, based on the "payment" scenario, the present disclosure provides example payment methods as shown in FIG. 17 and FIG. 18.

Figure 17:
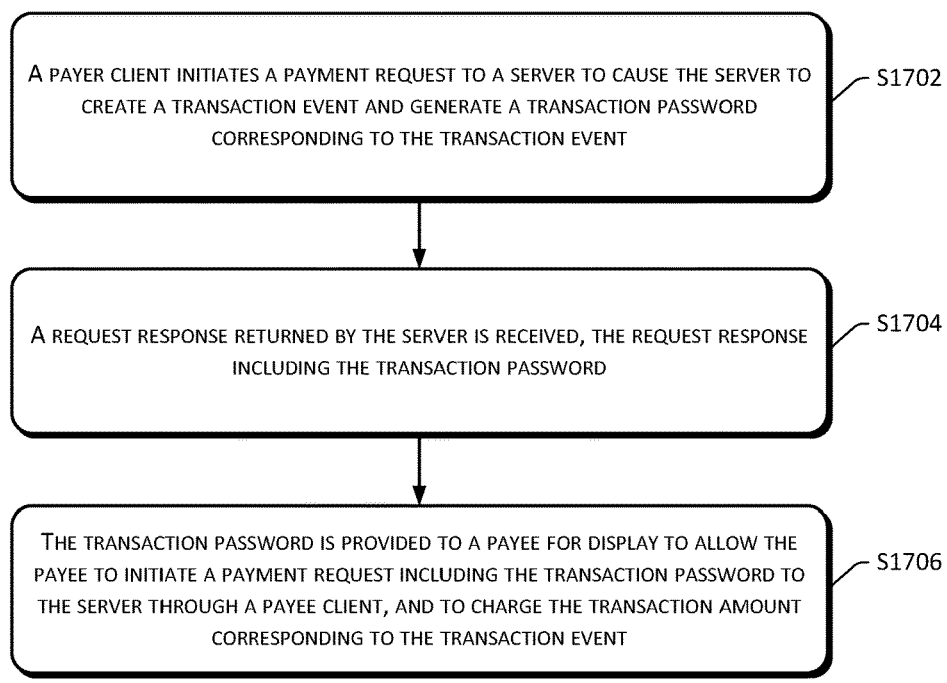
FIG. 17 is a flowchart illustrating a payment method based on a terminal side according to an exemplary embodiment of the present disclosure.
Figure 18:
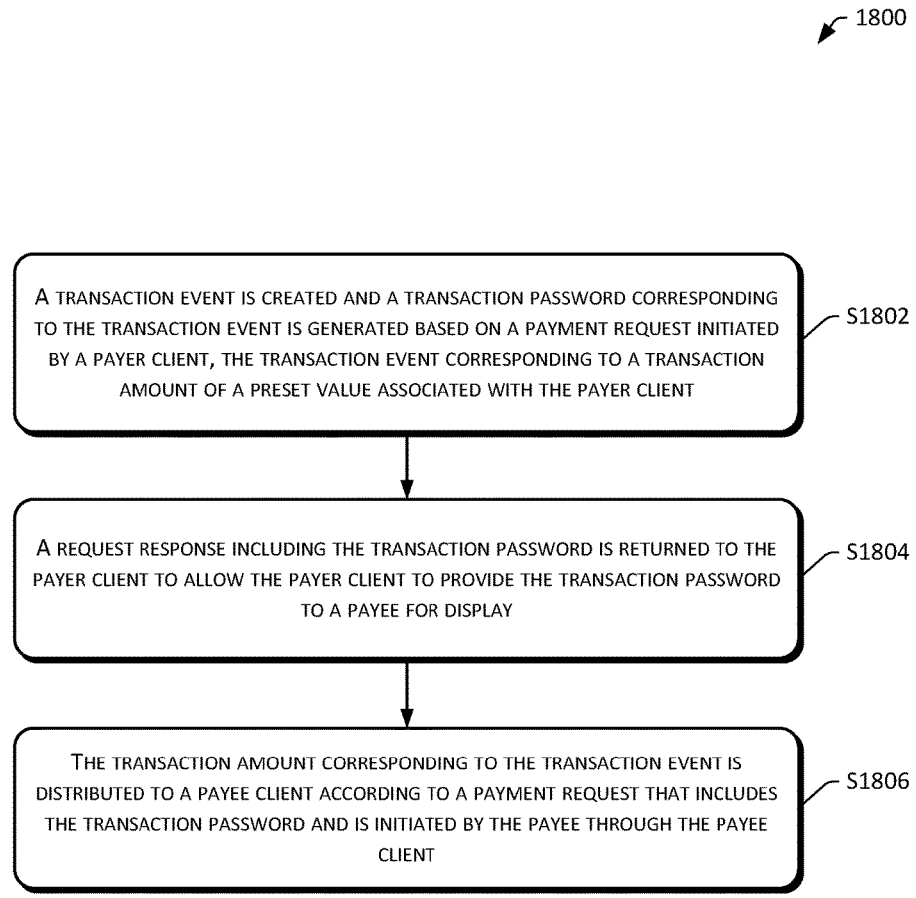
FIG. 18 is a flowchart illustrating a payment method based on a server side according to an exemplary embodiment of the present disclosure.

FIG. 17 shows a flowchart of a payment method 1700 based on a terminal side according to an exemplary embodiment of the present disclosure. The method 1700 is applied in a terminal corresponding to a sending client, and may include the following method blocks.

At S1702, a payer client initiates a payment request to a server to cause the server to create a transaction event and generate a transaction password corresponding to the transaction event, the transaction event corresponding to a transaction amount of a preset value associated with the payer client.

At S1704, a request response returned by the server is received, the request response including the transaction password.

At S1706, the transaction password is provided to a payee for display to allow the payee to initiate a payment request including the transaction password to the server through a payee client, and to charge the transaction amount corresponding to the transaction event.

Corresponding, FIG. 18 shows a flowchart of a payment method 1800 based on a server side according to an exemplary embodiment of the present disclosure. The method 1800 is applied in a server, and may include the following method blocks.

At S1802, a transaction event is created and a transaction password corresponding to the transaction event is generated based on a payment request initiated by a payer client, the transaction event corresponding to a transaction amount of a preset value associated with the payer client.

At S1804, a request response including the transaction password is returned to the payer client to allow the payer client to provide the transaction password to a payee for display.

At S1806, the transaction amount corresponding to the transaction event is distributed to a payee client according to a payment request that includes the transaction password and is initiated by the payee through the payee client.

Figure 19:
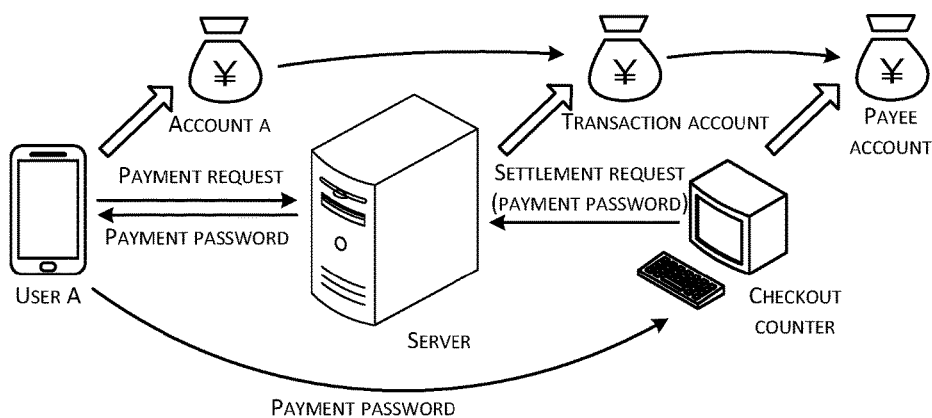
FIG. 19 is a schematic diagram illustrating a payment scenario according to an exemplary embodiment of the present disclosure.

Based on the foregoing embodiments, FIG. 19 shows a schematic diagram of a payment scenario 1900 according to an exemplary embodiment of the present disclosure. As shown in FIG. 19, after the user A goes shopping in a supermarket and needs to conduct a payment operation at a checkout counter, details of a process thereof may include the following:

1) After the checkout counter scans items purchased by the user A, an amount that needs to be paid is determined as x.

2) The user A inputs an amount x on a payer client, and initiates a payment request corresponding to the amount x to a server. The server generates a corresponding transaction event and a payment password associated with the transaction event, and returns the payment password to the user A.

In implementations, the server extracts transaction funds of the amount x from an account a corresponding to the user A based on the amount x inputted by the user A, and transfers the funds into a transaction account corresponding to the transaction event. Apparently, this is used as an example only, and a processing method corresponding to FIG. 12 may also be used.

3) The user A displays the payment password to the checkout counter, for example, by showing a picture including the payment password to a personnel at the checkout counter, or verbally conveying the content of the payment password to the personnel.

4) The checkout counter initiates a settlement request to the server, with the settlement including the payment password. The server may then transfer the amount x from the transaction account corresponding to the payment password to a cashier account corresponding to the checkout counter.

In implementations, the checkout counter may add a value of the transaction amount into the settlement request for performing verification with the amount x inputted by the user A. If they are equal, the payment is completed. Otherwise, the payment is rejected.

5) After the payment is completed, the server may notify the user A and the checkout counter individually.

Figure 20:
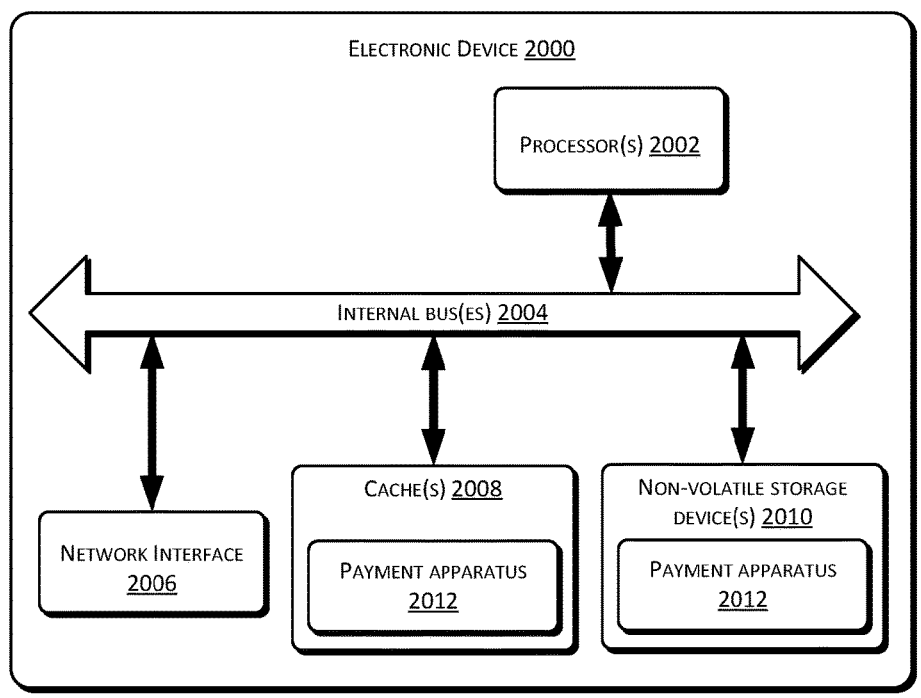
FIG. 20 is a structural diagram illustrating an electronic device based on a terminal side according to an exemplary embodiment of the present disclosure.

FIG. 20 is a structural diagram of an electronic device 2000 based on a terminal side according to an exemplary embodiment of the present disclosure. In a typical configuration, the electronic device 2000 may include one or more processors (CPU), an input/output interface, a network interface, and memory. For example, the electronic device 2000 may include processor(s) 2002, internal bus(es) 2004, network interface(s) 2006, cache(s) 2008, and non-volatile storage device(s) 2010 on a hardware level as shown in FIG. 20. Apparently, the electronic device 2000 may further include hardware needed by other services. The processor(s) 2002 may read a corresponding computer program from the non-volatile storage device(s) 2010 into the cache(s) 2008, and run the computer program, thereby forming a payment apparatus 2012 on a logic level. Apparently, other than software implementation, the present disclosure may include other ways of implementation, such as logic devices or a combination of software and hardware, etc. In other words, entities that perform processing procedure(s) as follows are not limited to various logic units, and may also include hardware or logic devices.

Figure 21:
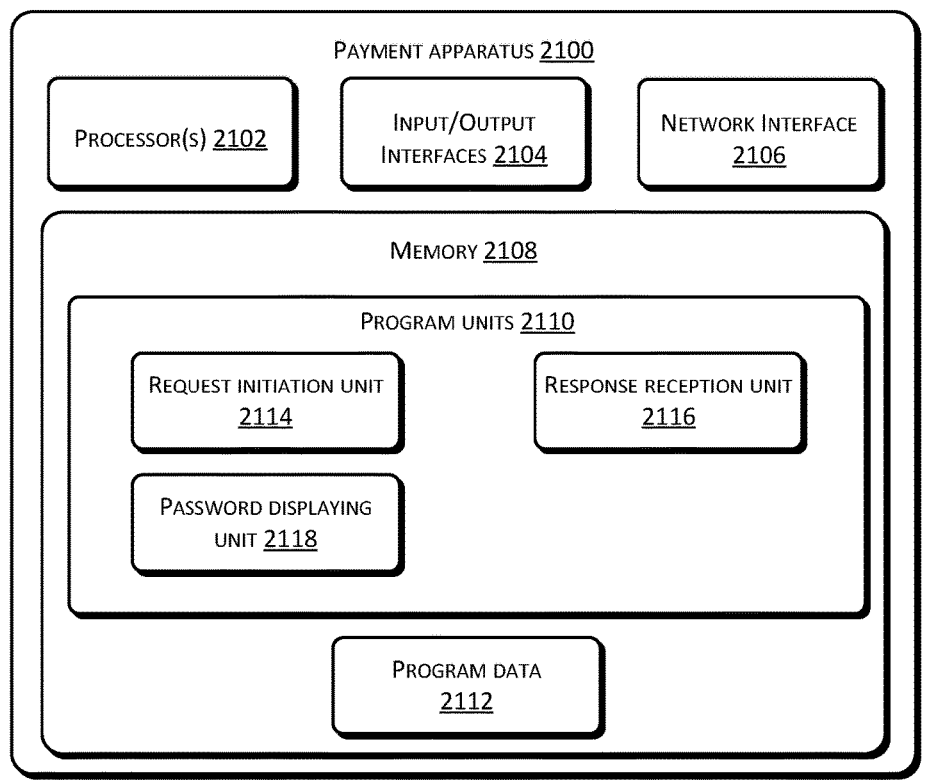
FIG. 21 is a schematic diagram illustrating a payment apparatus based on a terminal side according to an exemplary embodiment of the present disclosure.

Referring to FIG. 21, in implementations, a payment apparatus 2100 may be applied in a terminal of a payer client. In implementations, the payment apparatus 2100 may include one or more processors 2102, an input/output (I/O) interface 2104, a network interface 2106 and memory 2108.

The memory 2108 may include a form of computer-readable media, e.g., a non-permanent storage device, random-access memory (RAM) and/or a nonvolatile internal storage, such as read-only memory (ROM) or flash RAM. The memory 2108 is an example of computer-readable media as illustrated in the foregoing description.

In implementations, the memory 2108 may include program units 2110 and program data 2112. In implementations, the program units 2110 may include a request initiation unit 2114, a response reception unit 2116, and a password displaying unit 2118.

The request initiation unit 2114 may allow a payer client to initiate a payment request to a server to cause the server to create a transaction event and generate a transaction password corresponding to the transaction event, where the transaction event corresponds to a transaction amount of a preset value associated with the payer client. The response reception unit 2116 may receive a request response returned by the server, with the request response including the transaction password. The password displaying unit 2116 may display the transaction password to a payee to allow the payee to send a payment request that includes the transaction password to the server through a payee client and to charge the transaction amount corresponding to the transaction event.

Figure 22:
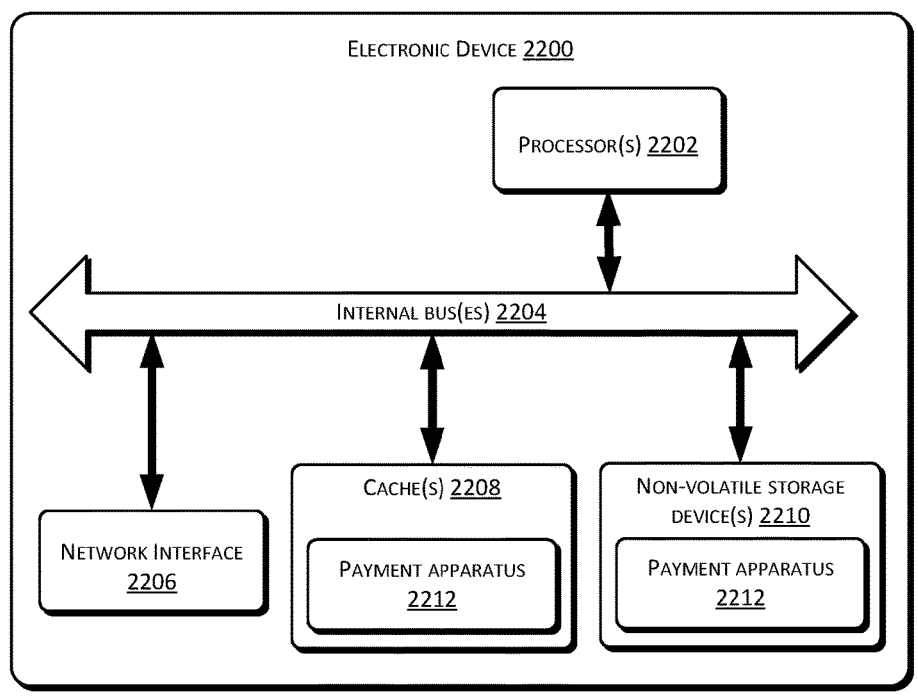
FIG. 22 is a structural diagram illustrating an electronic device based on a server side according to an exemplary embodiment of the present disclosure.

FIG. 22 is a structural diagram of an electronic device 2200 based on a server according to an exemplary embodiment of the present disclosure. In a typical configuration, the electronic device 2200 may include one or more processors (CPU), an input/output interface, a network interface, and memory. For example, the electronic device 2200 may include processor(s) 2202, internal bus(es) 2204, network interface(s) 2206, cache(s) 2208, and non-volatile storage device(s) 2210 on a hardware level as shown in FIG. 22.

Apparently, the electronic device 2200 may further include hardware needed by other services. The processor(s) 2202 may read a corresponding computer program from the non-volatile storage device(s) 2210 into the cache(s) 2208, and run the computer program, thereby forming a payment apparatus 2212 on a logic level. Apparently, other than software implementation, the present disclosure may include other ways of implementation, such as logic devices or a combination of software and hardware, etc. In other words, entities that perform processing procedure(s) as follows are not limited to various logic units, and may also include hardware or logic devices.

Figure 23:
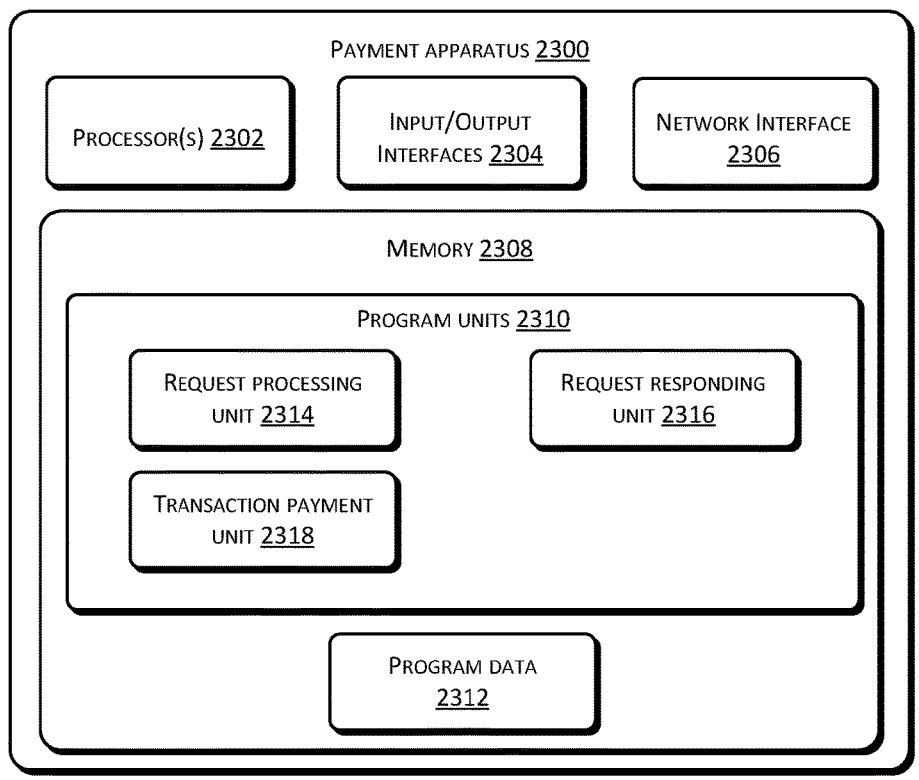
FIG. 23 is a schematic diagram illustrating a payment apparatus based on a server side according to an exemplary embodiment of the present disclosure.

Referring to FIG. 23, in implementations, a payment apparatus 2300 may be applied in a server. In implementations, the payment apparatus 2300 may include one or more processors 2302, an input/output (I/O) interface 2304, a network interface 2306 and memory 2308.

The memory 2308 may include a form of computer-readable media, e.g., a non-permanent storage device, random-access memory (RAM) and/or a nonvolatile internal storage, such as read-only memory (ROM) or flash RAM. The memory 2308 is an example of computer-readable media as illustrated in the foregoing description.

In implementations, the memory 2308 may include program units 2310 and program data 2312. In implementations, the program units 2310 may include a request processing unit 2314, a request responding unit 2316 and a transaction payment unit 2318.

The request processing unit 2314 may create a transaction event and generate a transaction password corresponding to the transaction event based on a payment request initiated by a payer client, where the transaction event corresponds to a transaction amount of a preset value associated with the payer client. The request responding unit 2316 may return a request response that includes the transaction password to the payer client to allow the payer client to display the transaction password to a payee. The transaction payment unit 2318 may distribute the transaction amount corresponding to the transaction event to the payee client according to a payment request that includes the transaction password and is initiated by the payee through a payee client.

It should further be noted that terms such as "comprise", "include" and any other variants thereof are intended to cover a non-exclusive inclusion. A process, method, product or device that includes a series of elements not only includes those elements, but also includes other elements that are not explicitly listed, or further includes elements that already existed in such process, method, product or device. In a condition without further limitations, an element defined by a phrase "include a/an . . . " does not exclude any other similar elements from existing in the process, method, product or device.

The above descriptions are merely exemplary embodiments of the present disclosure, and are not intended to limit the present disclosure. Any modifications, equivalent replacements and improvements made without departing from the spirit and the principles of the present disclosure shall fall within the scope of protection of the present disclosure.

What is claimed is:

1. A method comprising:
    initiating, by a sending client, an interaction request to a server to cause the server to generate an object set and a fetching password associated with the object set, the object set corresponding to a first amount of funds of the sending client;
    receiving a request response returned from the server, the request response including the fetching password;
    providing the fetching password for presentation to a receiving user to allow the receiving user to initiate a fetching request including the fetching password to the server via a receiving client;
    causing the receiving user to send a number to the server to cause the server to determine a comparison between the number and the first amount of funds; and
    providing the first amount of funds or a second amount of funds corresponding to the object set to be obtained by the receiving user, the first amount of funds being distributed by the server upon determining that the comparison is equal, the second amount of funds being distributed by the server upon determining that the comparison is not equal, and the second amount of funds being less than the first amount of funds or zero;
    distribution of funds to a receiving user being nonexclusive of distribution of funds corresponding to the object set to another receiving user.

2. The method of claim 1, wherein providing the fetching password for presentation to the receiving user comprises:
    generating a display picture including the fetching password or obtaining the display picture included in the request response; and
    providing the display picture for presentation to the receiving user.

3. The method of claim 2, wherein providing the display picture for presentation to the receiving user comprises:
    sending the display picture to the receiving client; or
    sharing the display picture in a social networking platform.

4. The method of claim 2, wherein generating the display picture comprises:
    generating a template ID corresponding to the fetching password or obtaining the template ID included in the request response;
    obtaining a picture attribute template corresponding to the template ID from local data or the server; and
    dynamically generating the display picture according to the picture attribute template.

5. One or more computer-readable media storing executable instructions that, when executed by one or more processors, cause the one or more processors to perform acts comprising:
    generating an object set and a fetching password associated with the object set according to an interaction request initiated by a sending client, the object set corresponding to a first amount of funds of the sending client;
    returning a request response including the fetching password to the sending client to cause the sending client to provide the fetching password for presentation to a receiving user; and
    distributing the first amount of funds or a second amount of funds corresponding to the object set a receiving client according to a fetching request that includes the fetching password and is initiated by the receiving user through the receiving client and to determining a comparison between a number sent by the receiving user through the receiving client and the first amount of funds, the first amount of funds being distributed upon determining that the comparison is equal, the second amount of funds being distributed upon determining that the comparison is not equal, and the second amount of funds being less than the first amount of funds or zero;

distribution of funds to a receiving user being nonexclusive of distribution of funds corresponding to the object set to another receiving user.

6. The one or more computer-readable media of claim 5, wherein generating the fetching password comprises:
   generating a password generation serial number corresponding to the interaction request;
   converting the password generation serial number into a pseudo random number; and
   selecting a corresponding code book according to a password type pre-configured for the fetching password, and converting the pseudo random number according to the code book to obtain the fetching password.

7. The one or more computer-readable media of claim 6, wherein the password type comprises a number of characters and a method of combining the characters.

8. The one or more computer-readable media of claim 5, wherein returning the request response comprises:
   generating a display picture including the fetching password;
   adding the display picture into the request response; and
   sending the request response including the display picture to the sending client.

9. The one or more computer-readable media of claim 8, wherein generating the display picture comprises:
   generating a template ID corresponding to the fetching password;
   obtaining a picture attribute template corresponding to the template ID; and
   dynamically generating the display picture according to the picture attribute template.

10. The one or more computer-readable media of claim 5, wherein generating the object set comprises creating the object set and adding the first amount of funds of the sending client into the object set, and wherein distributing the first amount of funds or the second amount of funds comprises distributing the respective first amount of funds or second amount of funds in the object set to the receiving client.

11. The one or more computer-readable media of claim 5, wherein generating the object set comprises creating the object set, and associating the object set with the first amount of funds of the sending client, and wherein distributing the first amount of funds or second amount of funds comprises obtaining the respective first amount of funds or second amount of funds associated with the object set of the sending client and distributing the obtained respective first amount of funds or second amount of funds to the receiving client.

12. An apparatus comprising:
   one or more processors;
   non-transitory memory;
   a generation unit stored in the non-transitory memory and executable by the one or more processors to generate an object set and a fetching password associated with the object set according to an interaction request initiated by a sending client, the object set corresponding to a first amount of funds of the sending client;
   a sending unit stored in the non-transitory memory and executable by the one or more processors to return a request response comprising the fetching password to the sending client to enable the sending client to provide the fetching password for presentation to a receiving user; and
   a distribution unit stored in the non-transitory memory and executable by the one or more processors to distribute the first amount of funds or a second amount of funds corresponding to the object set to a receiving client according to a fetching request that includes the fetching password and is initiated by the receiving user through the receiving client and to determining a comparison between a number sent by the receiving user through the receiving client and the first amount of funds, the first amount of funds being distributed upon determining that the comparison is equal, the second amount of funds being distributed upon determining that the comparison is not equal, and the second amount of funds being less than the first amount of funds or zero;
   distribution of funds to a receiving user being nonexclusive of distribution of funds corresponding to the object set to another receiving user.

13. The apparatus of claim 12, wherein the generation unit generates the fetching password by:
   generating a password generation serial number corresponding to the interaction request;
   converting the password generation serial number into a pseudo random number; and
   selecting a corresponding code book according to a password type pre-configured for the fetching password and converting the pseudo random number to obtain the fetching password according to the code book.

14. The apparatus of claim 13, wherein the password type comprises a number of characters and a method of combining the characters.

15. The apparatus of claim 12, wherein the sending unit further generates a display picture including the fetching password, adds the display picture into the request response, and send the request response including the display picture to the sending client.

16. The apparatus of claim 15, wherein the sending unit further generates the display picture including the fetching password by:
   generating a template ID corresponding to the fetching password;
   obtaining a picture attribute template corresponding to the template ID; and
   dynamically generating the display picture according to the picture attribute template.

* * * * *